United States Patent [19]
Dent

[11] Patent Number: 5,790,606
[45] Date of Patent: Aug. 4, 1998

[54] JOINT DEMODULATION USING SPATIAL MAXIMUM LIKELIHOOD

[75] Inventor: Paul W. Dent, Stehags, Sweden

[73] Assignee: Ericsson Inc., Research Triangle Park, N.C.

[21] Appl. No.: 393,809

[22] Filed: Feb. 24, 1995

Related U.S. Application Data

[63] Continuation-in-part of Ser. No. 179,953, Jan. 11, 1994, Pat. No. 5,619,503.

[51] Int. Cl.[6] .............................. H04L 1/00; H04L 27/01
[52] U.S. Cl. .................... 375/348; 375/233; 375/262; 375/341; 375/350; 455/507; 455/278.1
[58] Field of Search ...................... 455/53.1, 67.1, 455/277.1, 277.2, 278.1, 279.1, 507; 375/219, 229, 230, 233, 262, 266, 299, 341, 343, 346–350; 379/59, 60; 342/373, 383

[56] References Cited

U.S. PATENT DOCUMENTS

| | | | |
|---|---|---|---|
| 5,202,903 | 4/1993 | Okanoue | 375/347 |
| 5,390,215 | 2/1995 | Antia et al. | 375/340 |
| 5,566,209 | 10/1996 | Forssen et al. | 375/262 |
| 5,615,409 | 3/1997 | Forssen et al. | 455/33.1 |

FOREIGN PATENT DOCUMENTS

| | | |
|---|---|---|
| 520 969 | 12/1992 | European Pat. Off. . |
| WO91/18458 | 11/1991 | WIPO . |

OTHER PUBLICATIONS

International Search Report regarding International Appln. No. PCT/US96/02498 Date of Mailing: 24 Jul. 1996.
"*Optimum Multiuser Detection in Single–Path Rayleigh Fading Channels*", Zvonar et al. Presented at Twenty–Ninth Allerton Conference on Communication, Control and Computing, pp. 390–399, Oct. 1991.
"*On Multiuser Detection in Asynchronous CDMA Flat Rayleigh Fading Channels*", Zvonar et al., PIMRC, five pages, 1992.
"*A Comparison of Differentially Coherent and Coherent Multiuser Detection With Imperfect Phase Estimates in Rayleigh Fading Channel*", Zvonar et al., IT, one page, 1993.
"*Adaptive Multiuser Receiver For Fading CDMA Channels With Severe ISI*", Zvonar et al., appearing in the Proceedings of Conference on Information Sciences and Systems, six pages, Mar. 1993.
"Signal Detection and Parameter Estimation in Multiuser Communications", Xie, *IEEE Transactions on Communications*, vol. 41, No. 7, pp. 1208–1216, Aug. 1993.
"A Spread–Spectrum Multiaccess System with Cochannel Interference Cancellation for Multipath Fading Channels", Yoon, *IEEE Jouranl on Selected Areas in Communications*, vol. 11, No. 7, pp. 1067–1975, Sep. 1993.
"On Synchronous CDMA for Mobile Communications", Kajiwara, *IEEE Globecom.*, pp. 858–862, 1992.
"*Optimum Detection in Asynchronous Multiple–Access Multipath Rayleigh Fading Channels*", Zvonar et al., Twenty–Sixth Annual Conference on Info. Sciences and Systems, Princeton Univ., six pages, Mar. 1992.
"*Suboptimum Multiuser Detector for Synchronous CDMA Frequency–Selective Rayleigh Fading Channels*", Zvonar et al., five pages, CTMC, 1992.
"Coherent and Differentially Coherent Multiuser Detectors for Asynchronous CDMA Frequency–Selective Channels", Zvonar et al., *IEEE MILCOM*, pp. 0442–0446, 1992.

(List continued on next page.)

*Primary Examiner*—Stephen Chin
*Assistant Examiner*—Amanda T. Le
*Attorney, Agent, or Firm*—Burns, Doane, Swecker & Mathis, L.L.P.

[57] ABSTRACT

Methods and systems for processing signals in radio communication systems are described which include processes for handling co-channel interference while reducing the number of Viterbi states being processed. A spatial analogy to the Viterbi MLSE process is provided. Both the uplink and downlink cases are described.

32 Claims, 7 Drawing Sheets

OTHER PUBLICATIONS

"Minimum Probability of Error for Asynchronous Gaussian Multiple-Access Channels", Verdu, *IEEE Transactions on Information Theory*, vol. IT-32, No. 1, pp. 85–96, Jan. 1986.

"Linear Multiuser Detectors for Synchronous Code-Division Multiple-Access Channels", Lupas et al., *IEEE Transactions on Information Theory*, vol. 35, No. 1, pp. 123–136, Jan. 1989.

"Near-Far Resistance of Multiuser Detectors in Asynchronous Channels", Lupas et al., *IEEE Transactions on Communications*, vol. 38, No. 4, pp. 496–508, Apr. 1990.

"A Near-Far Resistant Sliding Window Decorrelating Algorithm for Multi-User Detectors in DS-CDMA Systems", Wijayasuriya et al., *IEEE Globecom.*, pp. 1331–1338, 1992.

"Rake Decorrelating Receiver for DS-CDMA Mobile Radio Networks", Wijayasuriya et al., *Electronics Letters*, vol. 29, No. 4, pp. 395–396, Feb. 1993.

"Rake Decorrelation as an Alternative to Rapid Power Control in DS-CDMA Mobile Radio", Wijayasuriya et al., *IEEE*, pp. 368–371, 1993.

"A Family of Suboptimum Detectors for Coherent Multiuser Communications", Zie et al., *IEEE Journal on Selected Areas in Communications*, vol. 8, No. 4, May, 1990.

"Adaptive Maximum-Likelihood Receiver for Carrier-Modulated Data-Transmission Systems", Gottfried Ungerboeck, *IEEE Transactions on Communications*, vol. COM-22, No. 5, pp. 624–636, May, 1974.

FIG. 6(a)
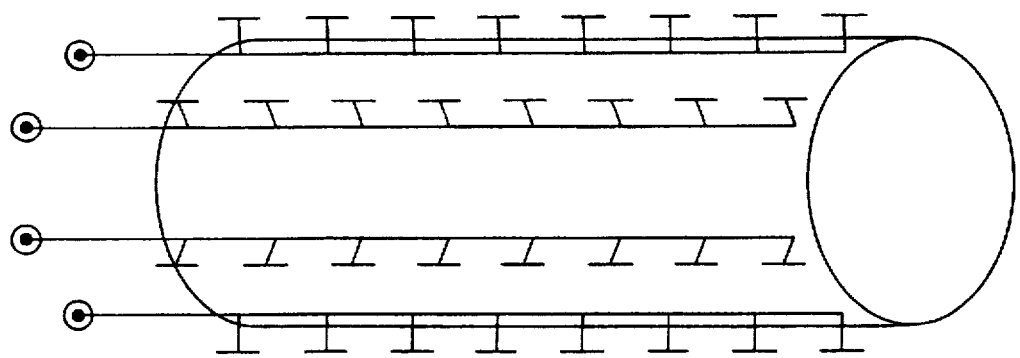
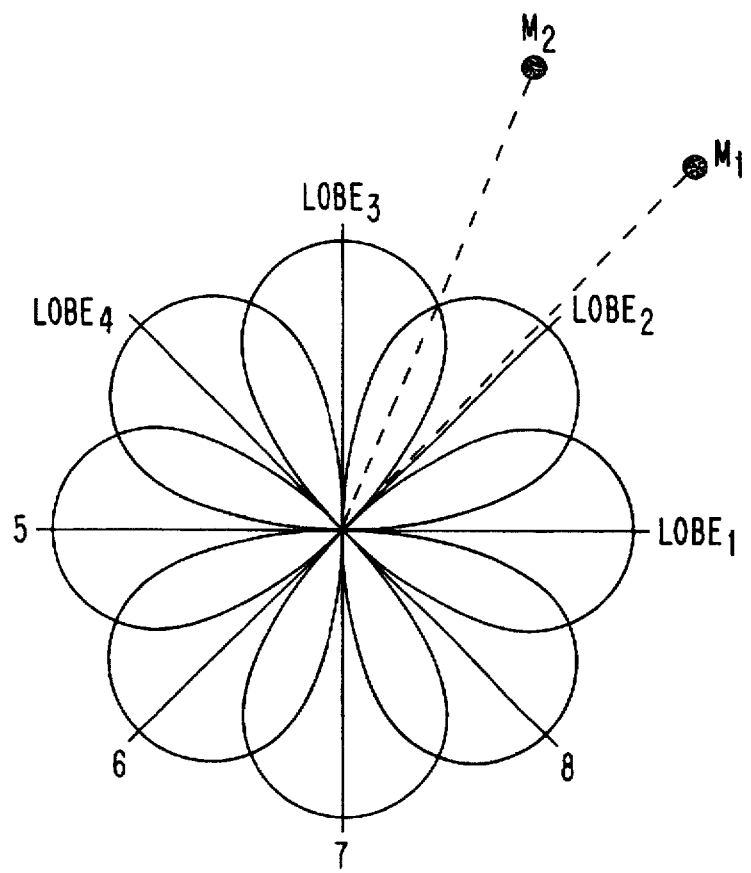
FIG. 6(b)

JOINT DEMODULATION USING SPATIAL MAXIMUM LIKELIHOOD

RELATED APPLICATION

This application is a continuation-in-part of U.S. patent application Ser. No. 08/179,953 entitled "Cellular Communications System Using Interference Cancellation", filed Jan. 11, 1994, now U.S. Pat. No. 5,619,503, which application is incorporated here by reference.

BACKGROUND

The present invention belongs to the art of multiple access communications systems such as indoor wireless communications (wireless PABX's), wireless Local Area Networks (Wireless LANS), cellular landmobile communications systems and mobile satellite communications systems. Such systems are characterized by at least one fixed base or relay station attempting to maintain communications with a plurality of subscriber stations or terminals. These fixed stations are arranged to provide area coverage, for example to cover different countries in the case of a satellite communications system, to cover different cities in the case of cellular communications system networks, or to cover different floors or corridors in the case of an indoor wireless network.

In such systems, capacity to support a large number of subscribers is measured in units such as Erlangs per MHz per square kilometer. Thus the capacity can be increased by using more MHz of bandwidth, or by reducing the area covered by each base station so that there are more base stations per square kilometer. The latter technique, namely of reducing cell size, increases the infrastructure cost, so it is a better measure of the cost-efficiency of a multiple access system to express capacity as Erlangs per MHz per cell.

If adjacent cells use the same frequency, interference between those cells can occur. On the other hand, if adjacent cells are not permitted to use the same frequency, by implementing a so-called frequency re-use plan that guarantees a minimum spatial separation of N cells between cells using the same channels, then the number of channels available in any one cell is reduced by N squared. In the parent application, it is shown that coding signals by adding redundancy and expanding their bandwidths such that they can tolerate adjacent cell interference leads to greater capacity than minimizing bandwidth at the expense of interference tolerance and being thereby forced to use frequency planning. This result relies on being able to avoid worst case interference situations such as two terminals on the border between two cells using the same frequency. Geographical proximity of terminals is referred to herein as terminals which are "cosited". The parent application avoids these situations by, for example, a sorting process that allocates terminals to frequencies such that almost-cosited terminals are not allocated the same frequency. The parent application also describes, among other things, two different ways to utilize multi-element antenna arrays to resolve co-channel interference.

In a first method, each antenna element receives a different combination of signals from a number of terminals. When the number of antenna elements is at least as great as the number of co-channel signals, this results in a set of simultaneous equations that can be solved to separate the individual terminal signals, thus undoing the process of co-channel signal mixing that takes place in the aether, providing terminals are not cosited.

In the cosited case, the matrix of signal coefficients becomes singular and cannot be inverted, and the equations cannot be solved. For that case, the parent application discloses an alternative method in which it is not attempted to undo the process of co-channel signal mixing that takes place in the aether; rather, the process of mixing is applied to hypotheses of the co-channel signals to predict what should be received at each antenna element, and a mismatch between the predictions and the actually received signals is calculated as an indication of the likelihood of each hypothesis. The hypothesis which results in the lowest cumulative mismatch over several symbol periods is then determined by applying the Sequential Maximum Likelihood Sequence Estimation algorithm, commonly called the Viterbi algorithm or the Dynamic Programming algorithm (DP).

In the parent disclosure, use of the Viterbi algorithm for jointly demodulating co-channel signals received by an antenna array was described for the case of a number of co-channel signals received at a base station multi-element antenna array. The algorithm complexity for binary signals was on the order of 2 to the power of the number of co-channel signals, thus imposing a practical difficulty on processing a large number of co-channel signals received at a base station due to the doubling of complexity for each added signal.

SUMMARY

The present invention provides an alternative method for handling co-channel interference for cases where the elements of an antenna array receive signals from different subsets of terminals, as for example in an indoor application where antenna elements may be distributed at intervals along a corridor, or in a wide area cellular system where different elements receive signals from different sectors or cells. Exemplary embodiments show how, in such cases, the complexity of the processing increases only proportionally rather than exponentially with the total number of co-channel signals processed and thus the complexity per unit of installed capacity is substantially constant.

In an exemplary application of the invention, an indoor wireless communications system includes a number of distributed antennas for receiving wireless signals from portable telephone units operating on the same radio frequency channel. Interference between different remote units is prevented by first determining for each portable unit's signal a number of, for example three, distributed antennas that receive that signal most strongly. Any such antennas also receive interfering signals from other portable units. By hypothesizing the information transmitted by the interfering units, their effect on the wanted signal reception is accounted for, enabling it to be demodulated error free. Different estimates of the wanted signal are obtained for each hypothesis of the interfering signals and stored for future resolution, when similar estimates of the interfering signals are made using the antenna groups that receive those signals most strongly. An analogy is made between the Sequential Maximum Likelihood Sequence Estimation algorithm for decoding coded symbols transmitted sequentially in time, and the demodulation of signals received at distributed antennas placed sequentially in the spatial dimension in order to construct an efficient device for implementing the present invention.

BRIEF DESCRIPTION OF THE DRAWINGS

These and other objects, features and advantages of the present invention will become more readily apparent from the following detailed description when read in conjunction with the attached Figures in which:

FIG. 6(a) shows vertical, co-linear dipole arrays on a reflecting cylinder according to an exemplary embodiment of the present invention;

FIG. 6(b) depicts polar radiation patterns which exemplify those produced by an eight sector dipole array;

DETAILED DESCRIPTION

Figure 1:
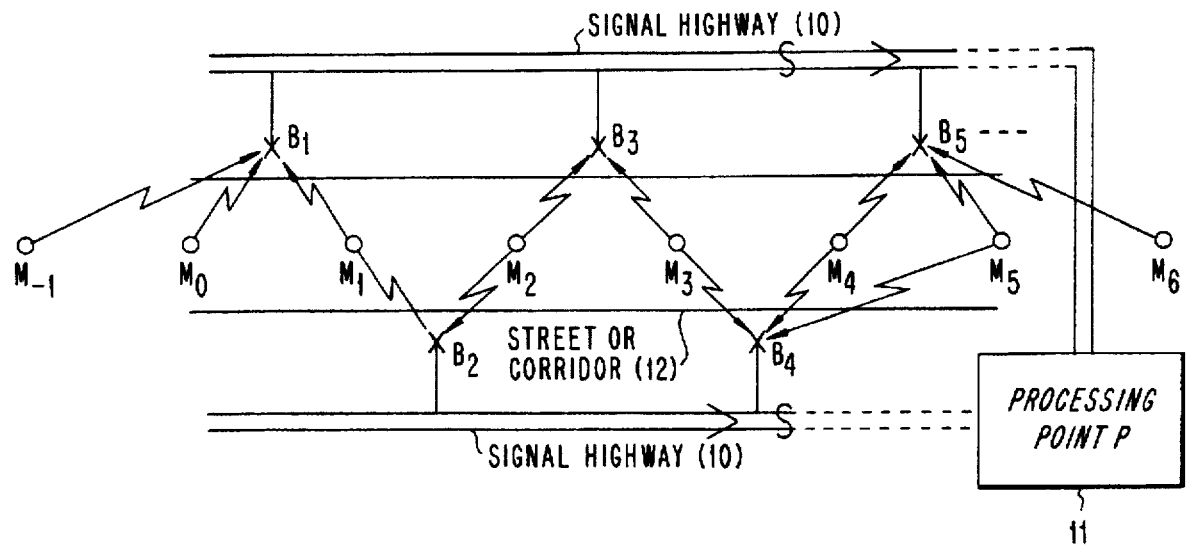
FIG. 1 illustrates an exemplary application of the present invention in a long corridor.

For the purposes of a first illustration of the present invention, FIG. 1 shows a long corridor or street with receiving antennas distributed along its length at more or less regular intervals. These antennas or base stations are denoted by $B_1$, $B_2$, $B_3$, $B_4$, and $B_5$ and receive signals from movable units denoted by $M_{-1}$, $M_0$, $M_1$, $M_2$, $M_3$, $M_4$, $M_5$ and $M_6$ in FIG. 1. The received signals from distributed antennas $B_1$–$B_5$, after suitable local processing such as amplification, filtering and digitizing, may be multiplexed onto one or more data collecting signal highways 10 for transport to a signal processing point 11.

For the sake of simplification, it will be assumed for the moment that each distributed antenna receives three signals from three nearby mobile units operating on the same frequency. Of course this assumption is purely for purposes of illustration and those skilled in the art will appreciate that the present invention can be applied to any number of signals received from any number of mobile units.

For example, in FIG. 1 base antenna $B_1$ receives signals from $M_{-1}$, $M_0$ and $M_1$ in respective amounts $c_{-1}$, $c_0$ and $c_1$ while base unit $B_2$ receives $M_0$, $M_1$ and $M_2$ in respective amounts $c'_0$, $c'_1$ and $c'_2$ and so on. This exemplary embodiment processes the signals collected at processing point 11 in the following way.

Assuming the signal modulation is binary (i.e. each signal can only take on the arithmetic value $+1$ or $-1$, being equivalent to Boolean values 0 or 1), then it is postulated that mobile unit $M_{-1}$ is transmitting a bit $b_{-1}$ of value Boolean zero (arithmetic $+1$) which is received in amount $c_{-1}$ at $B_1$, i.e. the signal value $+c_{-1}$ is received. Likewise $M_0$ is postulated to be transmitting $b_0$ and mobile $M_1$ to be transmitting $b_1$. Thus the total signal received at $B_1$, which we can denote by $S_1$ is given by:

$S_1 = c_{-1} \cdot b_{-1} + c_0 \cdot b_0 + c_1 \cdot b_1 = c_{-1} + c_0 + c_1$ for the hypothesis that $b_{-1} = b_0 = b_1 =$ Boolean 0

Likewise the other seven hypotheses for the three unknown bits can be made and a table containing in total 8 possible values for S1 can be constructed as shown in Table 1 below:

TABLE 1

| HYPOTHESIS | $b_{-1}$ | $b_0$ | $b_1$ | $S_1$ |
|---|---|---|---|---|
| 0 | 0 | 0 | 0 | $c_{-1} + c_0 + c_1$ |
| 1 | 0 | 0 | 1 | $c_{-1} + c_0 - c_1$ |
| 2 | 0 | 1 | 0 | $c_{-1} - c_0 + c_1$ |
| 3 | 0 | 1 | 1 | $c_{-1} - c_0 - c_1$ |
| 4 | 1 | 0 | 0 | $-c_{-1} + c_0 + c_1$ |
| 5 | 1 | 0 | 1 | $-c_{-1} + c_0 - c_1$ |
| 6 | 1 | 1 | 0 | $-c_{-1} - c_0 + c_1$ |
| 7 | 1 | 1 | 1 | $-c_{-1} - c_0 - c_1$ |

It will be noted by those skilled in the art that a two-fold symmetry can be exploited to reduce the effort in calculating the values of $S_1$, since half the values in Table 1 are simply the negatives of the other half. An even more efficient method to calculate the eight $S_1$ values is to note that the value in row 1 differs from the value in row 0 by $-2c_1$; the value in row 2 differs from that in row 0 by $-2c_0$; the value in row 3 differs from that in row 2 by $-2c_1$ and so on. Thus each value in the first 4 rows can be calculated by means of only one addition or subtraction from the value of another row, and the remaining four are just the negatives of the first four. Thus instead of 8 operations to add three numbers, only one operation to add three numbers and three to add a pair of numbers are needed. For larger numbers of hypotheses dependent on more signals, it may be verified that the signal hypotheses are most efficiently calculated in Grey code order, a binary ordering such that only one binary bit changes sign between successive hypotheses, which in turn only requires one addition or subtraction of a value such as 2c0.

The signal hypotheses calculated in the above manner are used at processor point 11 in comparison with a received signal sample from base antenna $B_1$. Typically, the squared-modulus mismatch would be calculated between each predicted signal value and the actually received value, and added to a cumulative mismatch or "metric" associated with each hypothesis. This could result in Table 2 below (wherein the metric values are purely exemplary).

TABLE 2

| HYPOTHESIS | $b_{-1}$ | $b_0$ | $b_1$ | METRIC |
|---|---|---|---|---|
| 0 | 0 | 0 | 0 | 0.72 |
| 1 | 0 | 0 | 1 | 0.39 |
| 2 | 0 | 1 | 0 | 1.04 |
| 3 | 0 | 1 | 1 | 1.34 |
| 4 | 1 | 0 | 0 | 0.13 |
| 5 | 1 | 0 | 1 | 0.32 |
| 6 | 1 | 1 | 0 | 0.98 |
| 7 | 1 | 1 | 1 | 0.49 |

A choice can be made between the hypotheses at this stage, in which case the metric in row 4 is the least mismatch, so the hypothesis 100 is the most likely. However, processor point 11 has other information received by the other antennas, e.g., $B_2$, $B_3$, $B_4$ and $B_5$ which can be used in further processing to obtain a more reliable decision. Processor point 11 can therefore continue to produce hypothesized signal values for all possible combinations of $b_0$, $b_1$ and $b_2$ that are received at antenna $B_2$ for comparison with the signal $S_2$ received at $B_2$. The squared mismatch between the prediction and the actual signal is then accumulated with corresponding previous metrics from Table 2. A corresponding metric is one which is associated with the same hypotheses for the two bits $b_0$, $b_1$ which are common between the old hypotheses of Table 2 and the new hypotheses. Table 3 shows some possible new mismatch values, called DELTA METRICS, between predicted and actual values of $S_2$.

TABLE 3

| HYPOTHESIS | $b_0$ | $b_1$ | $b_2$ | DELTA METRIC |
|---|---|---|---|---|
| 0 | 0 | 0 | 0 | 0.82 |
| 1 | 0 | 0 | 1 | 0.11 |
| 2 | 0 | 1 | 0 | 1.53 |
| 3 | 0 | 1 | 1 | 1.23 |
| 4 | 1 | 0 | 0 | 0.96 |
| 5 | 1 | 0 | 1 | 0.87 |
| 6 | 1 | 1 | 0 | 1.67 |
| 7 | 1 | 1 | 1 | 0.55 |

The DELTA METRIC for $b_0$, $b_1$, $b_2$=000 may be accumulated with the old metric of either previous hypothesis $b_{-1}$, $b_0$, $b_1$=000 or 100, as both are consistent in their $b_0$, $b_1$ positions, i.e., they are both corresponding metrics. The previous hypothesis with the lower metric is thus chosen to add the delta metric to since a conclusion of hypothesis likelihood based upon a lowest cumulative metric value is desired. This is old hypothesis number 4, with metric 0.13, giving an accumulated metric of 0.13+0.82=0.95. To indicate which of two previous metrics were used to produce a new metric after accumulation with a delta metric, a new column called PATH HISTORY is added to produce Table 4 wherein each of the new accumulated metrics is calculated in the manner described above for row 1 of Table 3.

TABLE 4

| PATH HISTORY | ($b_{-1}$) | $b_0$ | $b_1$ | $b_2$ | ACCUMULATED METRIC |
|---|---|---|---|---|---|
|  | 1 | 0 | 0 | 0 | 0.95 |
|  | 1 | 0 | 0 | 1 | 0.24 |
|  | 1 | 0 | 1 | 0 | 1.85 |
|  | 1 | 0 | 1 | 1 | 1.55 |
|  | 1 | 1 | 0 | 0 | 1.94 |
|  | 1 | 1 | 0 | 1 | 1.85 |
|  | 1 | 1 | 1 | 0 | 2.16 |
|  | 1 | 1 | 1 | 1 | 1.04 |

The "PATH HISTORY" column contains at this point only one value, that of the $b_{-1}$ hypothesis associated with the selected predecessor hypothesis. This value happens to be '1' in all the above rows, because the exemplary metric values in Table 2 associated with hypotheses having a $b_{-1}$ value of "1" happen to be lower than those associated with corresponding (i.e., same $b_1$ and $b_2$ values) hypotheses having a $b_{-1}$ value of "0". Therefore $b_{-1}$=1 is the final decision in the above example; however this need not have been the case and examples can be envisioned wherein the $b_{-1}$ now was still indeterminate at this stage.

The above procedure may be simplified by noting that the lower of two metrics selected for accumulation with a delta metric can be determined prior to creating and storing the table. Then, only four rows can be stored, instead of eight. For example, this can be applied to Table 4, resulting in Table 5.

TABLE 5

| PATH HISTORY | ($b_{-1}$,$b_0$) | $b_1$ | $b_2$ | ACCUMULATED METRIC |
|---|---|---|---|---|
|  | 10 | 0 | 0 | 0.95 |
|  | 10 | 0 | 1 | 0.24 |
|  | 10 | 1 | 0 | 1.85 |
|  | 11 | 1 | 1 | 1.04 |

In Table 5 it can be seen that not all rows agree on the value of $b_0$ to be retained at this stage, the fourth row having a '1' where the first three have a '0'. Thus, as compared with the $b_{-1}$ values in this example, a "final" determination of these $b_0$ values has not yet been reached.

The processor point 11 then continues to process the signal received at antenna $B_3$ using hypotheses of $b_3$ in addition to the already-made hypotheses of $b_1$ and $b_2$, and the four rows are updated by accumulating a new delta metric as before to obtain a new eight rows which are then collapsed to the best four. At this point the path history would contain surviving triplets of $b_{-1}$, $b_0$ and $b_1$. If all surviving rows agree in one of these bit positions, that is the final decision for the bit and it may be removed and further processed into, for example, speech with the aid of a Digital to Analog convertor such as a Continuously Variable Slope Delta Modulator (CVSD) convertor. If $b_1$ was removed and processed in this way for example, the resulting speech signal would be that having been transmitted from mobile unit $M_1$.

The above process will be recognized by a person skilled in the art as being similar in some respects to the Viterbi algorithm for decoding convolutionally coded data transmitted as sequential bits in time, except that the foregoing exemplary process decodes data transmitted from sequential locations in a spatial dimension. These inventive processes also lend themselves to a spatial distribution of the hardware necessary to accomplish the invention, and do not rely then on all information being available at a central processing point 11. Instead, the data highway 10 can pass the four rows retained from a previous stage from one base station location such as $B_1$ to the next, i.e. $B_2$, where processing will be contained to process the signal received at $B_2$ to generate four new rows. At some location, a firm decision will be possible for a data bit received from a mobile unit near an earlier location, and can then be passed back along the same data highway, if desired, or passed on to a central point such as point 11 where a mobile telephone exchange can be located to route said speech signals to their intended destinations in the telephone network.

A person skilled in the art will also know that the process described above ends up with the same result whether the process operates in the direction right to left or left to right. However, other factors can result in the two directions giving different results, so there can be advantages in processing both forwards and backwards along the spatial dimension, just as there can be advantages in processing forwards and backwards in the time dimension as described in U.S. Pat. No. 5,335,250 entitled "Bidirectional Demodulation Apparatus and Method" and filed on Oct. 22, 1992 to Paul W. Dent et al. and which disclosure is incorporated here by reference.

The other factors mentioned above include that the coefficients denoted by $c_{-1}$, $c_0$, $c_1$, etc. above also have to be estimated from the received signals. These coefficients are complex numbers that describe how each signal is rotated in phase and attenuated in amplitude in traversing the propagation path or channel between a mobile unit and a base unit. Determining these values is often known as channel estimation and according to exemplary embodiments simultaneous channel and data sequence estimation can be used herein.

In simultaneous channel and data estimations the values of the coefficients describing propagation from a mobile unit to each base unit are updated to new values each time a data bit from that mobile is decoded. The updating can wait until a final decision for the decoded bit is made, analogous to the time-sequential Viterbi disclosed in U.S. patent application Ser. No. 07/942,270, now U.S. Pat. No. 5,465,276, entitled "A Method of Forming a Channel Estimate for a Time Varying Radio Channel", which disclosure is incorporated here by reference. This method is known as delayed decision feedback. In its adaptation to the present invention, such a method involves feeding back decisions taken not after a time delay, but after processing at some point further along a spatial dimension. In some implementations, feedback after both a time delay and along a spatial dimension can be employed.

Another method of simultaneous data and channel estimation is described in U.S. Pat. No. 5,164,961 to Gudmundson which is also incorporated here by reference. This patent discloses a Viterbi algorithm in which separate channel estimates or coefficients are held for each row or Viterbi state in the above calculation process. That is, a separate set of coefficients $c_{-1}$, $c_0$, $c_1$, etc is held against each postulate of the corresponding bits. An advantage of this method is that the estimates can be updated on the assumption that the associated bit hypothesis is true, without waiting for it to be decided. The decision process then also selects not only the lower of metric pairs to become predecessors for new metrics, but also selects which of two associated channel estimates survives to be used for making the predictions for the next bit. In this way, the channel estimates are produced from the bit decisions contained in the associated PATH HISTORY. The technique of U.S. Pat. No. 5,164,961 is sometimes also referred to as a "channel model per state" algorithm.

The method of accumulating magnitude square mismatches to produce a metric, the lower of two metrics determining a preferred bit decision, is known as Maximum Likelihood Sequence Estimation or MLSE, as the resulting sequence of bits is the sequence with the highest probability. The sequence probability is the product of the individual bit probabilities. Quadratic metric accumulation is operates as an MLSE process only when the signal noise is white and Gaussian. Several alternative techniques for accumulating the metric are described in the literature, which can result in simplification of the computations. For example, Ungerboeck's diagonal metric decomposition disclosed in the publication entitled "Adaptive Maximum Likelihood Receiver for Carrier-Modulated Data Transmission Systems" found in IEEE Transactions on Communications, Vol. Comm-22, No. 5 at pp. 624–636 (1974) which disclosure is incorporated here by reference, may be employed which will be recognized as useful by a person skilled in the art of MLSE demodulation. This technique allows collection of terms in the metric that depend on the same bit being decoded and precalculation of a factor that will multiply that bit during metric calculations. The precalculated factor appears as the inner product of a vector of samples from successively spaced antennas with a conjugate vector of channel coefficients, and this computation can be performed once per iteration and need not repeated for each of the states of the machine, thereby effecting a saving in computation.

In the current application of joint demodulation, the sequence of bits decoded is not a set of bits transmitted sequentially in time from one transmitter, but a set of bits transmitted at the same time by many transmitters. It is not then necessarily of interest to maximize the product of the bit probabilities, but rather to maximize their ensemble average probability of being correct. This can be achieved by accumulating the negative exponential of the delta-metrics before accumulation. Picking the set of bits which maximize the sum of the negative exponential results in the bitset with the lowest ensemble average bit error probability.

The above described process is also analogous to a Viterbi decoder for continuously received convolutionally coded data, i.e. a signal stream that began in the past and continues into the future. However, a spatial analogy may also be made with a Viterbi machine for non-continuous data transmission, such as block data transmission. One such system is known as "tail-biting". In tis initial systems, a convolutional coder is initialized by loading the first of a number of bits to be coded into the encoding register. The encoder produces a number of coded bits and then a new bit shifted into the register. The process continues until a finite number of bits have been coded and then the bits first input are reinput to form a complete circle of input bits and to generate a complete circle of corresponding output bits. A decoder for such a circle of coded bits that have been received in a block can be started at any point in the circle and can continue to process bits moving sequentially either clockwise or anticlockwise until convergence to a unique decoded result is obtained.

Figure 2:
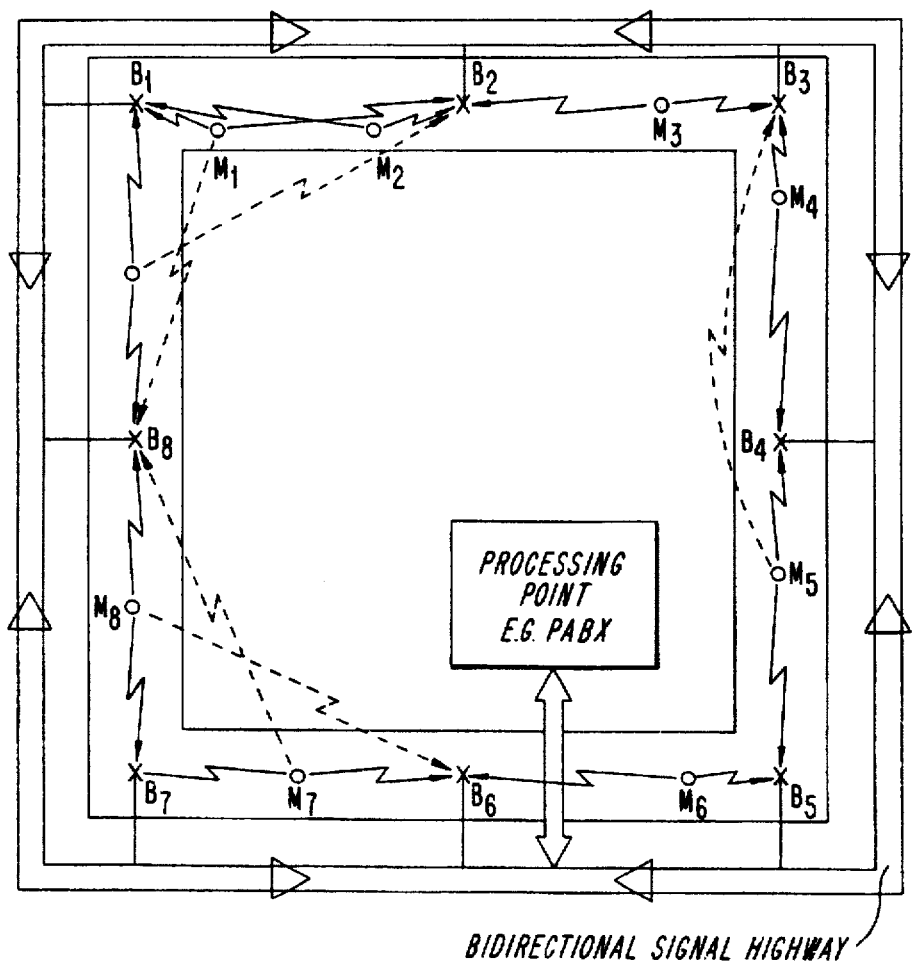
FIG. 2 illustrates another exemplary application of the present invention in a closed corridor.

FIG. 2 illustrates the spatial analogy made to apply tail-biting principles to a distributed network according to an exemplary embodiment of the present invention. The analogy can be made to a corridor running around the outside wall of one floor of a building. The antennas of a distributed indoor wireless communications system (e.g., those at fixed stations $B_1$–$B_8$) are placed at more or less regular intervals around the corridor forming a complete loop. Mobile units $M_0$–$M_8$ are disposed in the corridor and are transmitting to the antennas. A data highway 20 collects signals from around the loop that may have been partly processed locally for further processing centrally, in a wireless PABX 22 for example. The data highway can also be used to send and receive signals between said distributed antenna units and their local processing units.

The processing, whether distributed or central, comprises starting at any position around the loop with postulates of the signals received at that position. After local processing, information is then passed around the loop in either or both directions for incorporating the information received at other antennas. When the information has gone full circle, the result for the final bits hypothesized is compared with the surviving hypotheses for the same, originally postulated bits and processing is terminated if there is complete agreement. If complete agreement is not obtained at that stage, the process can continue around the loop again for as many antenna stages as necessary for agreement to occur. Since this process continues in space, not time, no time delay is implied in reaching a final result, except insofar as processing speeds are finite and thus incur a small amount of delay.

Yet another method for terminating a Viterbi process is known as the "tail bits" method. In this method, a convolutionally encoding process is initialized by zeroing the contents of a register. Data bits are shifted into the register and encoded bits calculated for each shift until the last data bit has just entered the first stage of the register, but has not gone all the way through. This last data bit is forced through by then applying known "tail" bits to the register until the last data bit is flushed through. Decoding comprises starting with the single hypothesis of all-zeros, corresponding to the known starting condition. Both possibilities for the first data bit are then hypothesized and tested by computing signal predictions and metrics, generating two rows or states. This process continues until the last of the initial zeros is flushed out of the register, at which point the number of rows or states stops doubling and remains constant. The number of states remains constant because, for each new bit that is hypothesized, the number of states doubles, but then because an earlier bit is flushed out, it can be decided by choosing the lower of two metrics thus halving the number of states again. The number of states thus remains constant until the known tail bits are processed. Because the tail bits are known, they do not give rise to two hypotheses, but only one, the known one. Thus as the tail bits flush through earlier-hypothesized bits, the number of states is not doubled before halving, and the number of states thus successively halves with application of new tail bits until a single, final row or state remains, which contains the desired result in its path history.

Figure 3:
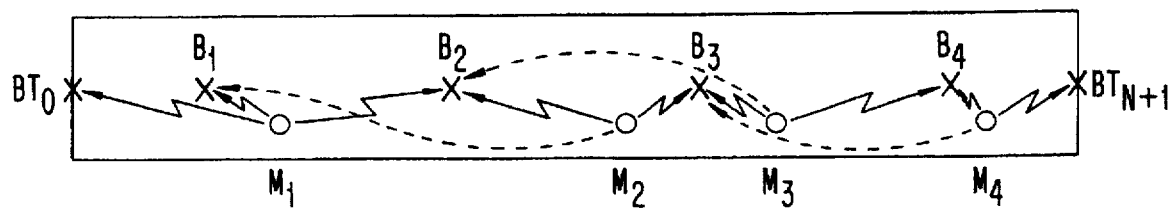
FIG. 3 illustrates a third exemplary application present invention in a finite length corridor.

The analogy to the use of tail bits in exemplary embodiments of the present invention is, for example, a finite corridor, as shown in FIG. 3. As in the earlier embodiments, a plurality of mobile stations ($M_1$-$M_4$) and antennas ($B_1$-$B_4$) are distributed throughout the corridor. In this case, the spatial Viterbi terminates due to the antennas disposed proximate the ends of the corridor ($BT_0$ and $BT_{n+1}$) receiving signals dependent on a diminishing number of unknown transmitted bits, thus allowing the number of hypotheses to be successively halved until a single result remains. Just as tail bits cause a greater number of coded bits to be generated than in tail-biting, so in the analogy a greater number of antennas is used in the "finite corridor" case than the number of co-channel signals to be resolved, whereas the number of antennas can be equal to the number of co-channel signals in the case of tail-biting. The analogy of decoding with "tail bits" is thus joint demodulation with the aid of "tail-antennas".

Inherent in the above discussion was the assumption that each signal received at an antenna depended on the same number (for example three) of mobile transmissions. The present invention can also be extended to the case where that number is variable, for which there is no known analogy with convolutional decoders. If such an analogy were to be constructed, it could be described as a convolutional code of dynamically variable constraint length and dynamically variable encoding polynomials. Before describing the general form of the invention, two other scenarios are envisaged in FIGS. 4 and 5.

Figure 4:
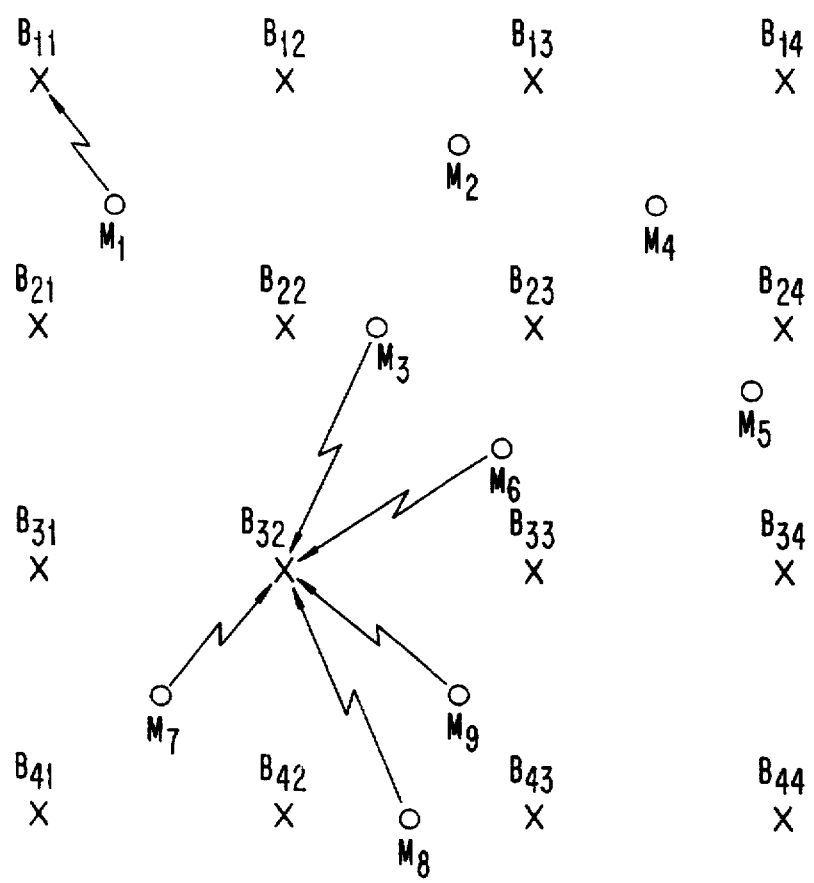
FIG. 4 depicts a two-dimensional distributed receiving system according to the present invention.

FIG. 4 illustrates the case of a 2-dimensional distribution of fixed base receiving antennas which are spaced apart uniformly for clarity. A 2-dimensional distribution of moving transmitters $M_1$-$M_9$ transmit signals to the antennas at $B_1, B_2, B_3 \ldots B_{44}$.

Not all signal paths indicated by jagged arrows between the moving transmitters and the fixed antennas are for clarity, but those shown are sufficient to indicate that different base antennas receive in general different numbers of spectrally overlapping, co-channel interferers. For example, $B_{11}$ receives signals primarily only from $m_1$, while $B_{32}$ receives signals from $M_3, M_6, M_7, M_8$ and $M_9$. In the two dimensional case, the composite signal received by an antenna no longer depends on sequentially numbered portable units such as ($M_1, M_2, M_3$); ($M_2, M_3, M_4$); etc, as it tended to do in the case of a linear distribution. This difference can become even more accentuated if the propagation from mobile to base units takes place over irregular terrain or in an urban environment with blockage due to buildings. This can mean that a base does not receive a signal from the mobile unit that is nearest to it, as might be expected, contributing to the unpredictability of determining which mobiles contribute to the signal at which bases. For the moment however it will be assumed that these contributions can be determined, along with the aforementioned channel coefficients $c_1, c_2$ etc., which can also be updated due to mobile movement that is much slower than the information signalling rate.

Figure 5:
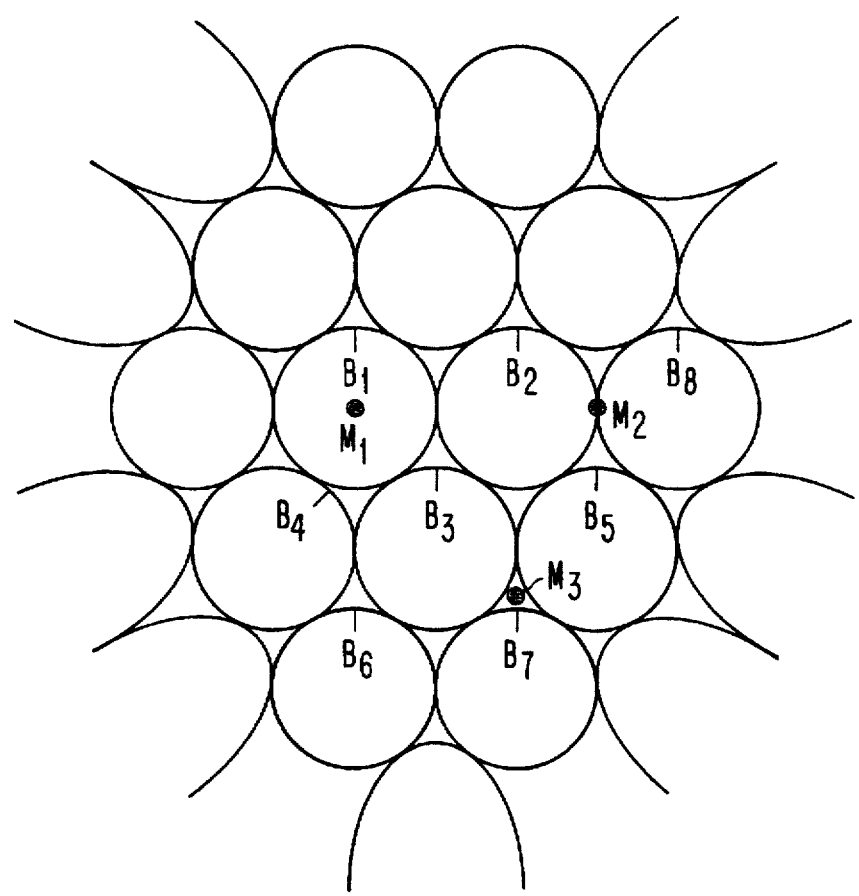
FIG. 5 shows an exemplary satellite spot beam embodiment of the present invention.

FIG. 5 shows another variant of a 2-dimensional case. An orbiting satellite equipped with a multiple spot-beam antenna, for example, as described in the parent application, illuminates partially overlapping areas on the ground denoted by $B_1, B_2, B_3$ in analogy with the base antenna notation used earlier. The difference in this case is that the antennas receiving signals from those areas are located on the orbiting satellite. Exemplary mobile stations $M_1, M_2$, and $M_3$ are disposed on the earth such that each mobile signal may be received in one or more satellite antenna beams. If a mobile typified by $M_1$ is in the center of a spot beam, its signal will be received largely only in that spot beam and not significantly in the neighboring beams. However, if the mobile, as typified by $M_2$, is at or near the border of two beams, it will contribute to the composite signal received by both antennas. The case typified by $M_3$ leads to the signal from $M_3$ being received to a significant extent in at least three antenna beams, i.e., beams $B_3, B_5$ and $B_7$. The satellite case is a favorable one for implementing the invention, as no beam signal would in general contain significant amounts of more than three cochannel interfering mobile signals. To use a regular (e.g. 4 state) Viterbi algorithm, it can be assumed that each beam contains exactly three mobile signals, even if two of them are very weak. However, because of the two-dimensional nature of the problem, the normal Viterbi algorithm cannot be used without modification according to this invention as will be described further below.

Another scenario in which the present invention can be applied is a three dimensional distribution of base antennas and mobile units, as for example may arise in a large building of many floors equipped with a wireless telephone system. As will be appreciated, the composite signal received at any antenna could in this case comprise spectrally overlapping signals from other floors as well as signals from mobile units on the same level.

The above scenarios are dealt with by the present invention in the following way. First of all, it is determined which of the mobile units are significant contributors to the signal received in any one antenna. Table 6 can be constructed to show the dependence of signals received at each antenna on the signals transmitted by the mobiles.

TABLE 6

| MOBILE NUMBER: | 1 | 2 | 3 | 4 | 5 | 6 | 7 | 8 | 9 ... |
|---|---|---|---|---|---|---|---|---|---|
| ANTENNA NUMBER 1 | x | x |   |   | x |   |   |   |   |
| ANTENNA NUMBER 2 |   | x |   | x | x |   |   |   |   |
| ANTENNA NUMBER 3 | x | x | x |   |   |   | x |   |   |
| ANTENNA NUMBER 4 |   |   | x | x | x |   |   |   |   |
| ANTENNA NUMBER 5 |   | x |   |   | x |   |   |   |   |
| ANTENNA NUMBER 6 |   | x |   |   | x | x |   |   | x |
| ANTENNA NUMBER 7 |   |   |   | x |   |   | x |   | x |
| ANTENNA NUMBER 8 | x |   |   |   |   |   |   | x |   |
| ANTENNA NUMBER 9 |   | x |   |   |   |   |   | x | x |

A cross in Table 6 indicates that the mobile signal is a significant contributor to that received antenna signal. Of course, all mobile signals are received to a greater or lesser extent by all antennas, but the significant contributors are defined as those whose signal strengths relative to the strongest signal are above some threshold. For example, if no signal was stronger than a threshold of 30 dB below the strongest signal, that antenna could be deemed to be receiving only one significant signal. The 9×9 size of the above table is not meant to be significant and is only for the purpose of illustration. Its total size may be much larger, and the number of antennas can exceed the number of mobiles or vice versa.

The signal decoding process to be described can be executed in principle in any order, starting with any mobile. For the purposes of illustration, mobile number 1 and all the rows that contain an X in the first column of Table 6 are identified. These are rows 1, 3 and 8. These rows are then evaluated to determine which other mobile units contribute significantly to the corresponding antennas. This results in the identification of mobiles number 2, 3, 5, 6 and 8 in this example. Assuming each mobile transmits a binary signal (+1 or −1), if the polarity of bits transmitted by these mobiles (2, 3, 5, 6, 8) were known, and the polarity of the bit of mobile 1 were hypothesized, then signal predictions could be formed for the signals that should be received at antennas 1, 3 and 8. Since the polarity of bits 2, 3, 5, 6 and 8 are not known they are hypothesized. All 32 (i.e., $2^5$) combinations are thus tried, and for each case, the bit of mobile 1 is first hypothesized to be a 1 and signal predictions for antennas 1, 3 and 8 are calculated as P1, P3 and P8. The predictions are compared with the actually received signals R1, R3 and R8, and the sumsquare mismatch is calculated as:

$$|P1-R1|^2+|P2-R2|^2+|P3-R3|^2$$

This process is repeated for the hypothesis that bit 1 is a zero (i.e., −1 in a −1 or +1 binary scheme) and, for each of the 32 states of the other bits, the hypothesis for bit 1 that gives the lowest sumsquare mismatch is determined. This decision, plus the lower of the two mismatches, is then in each case stored in a table against the hypothesis of the other bits as shown in Table 7.

TABLE 7

| DECISION FOR BIT 1 | HYPOTHESES FOR BITS | | | | | LOWEST MISMATCH |
|---|---|---|---|---|---|---|
| | 2 | 3 | 5 | 6 | 8 | |
| 1 | 0 | 0 | 0 | 0 | 0 | 3.2 |
| 0 | 0 | 0 | 0 | 0 | 1 | 3.5 |
| 0 | 0 | 0 | 0 | 1 | 0 | 2.7 |
| 0 | 0 | 0 | 0 | 1 | 1 | 2.3 |
| 1 | 0 | 0 | 1 | 0 | 0 | 4.9 |
| 0 | 0 | 0 | 1 | 0 | 1 | 5.1 |
| 1 | 0 | 0 | 1 | 1 | 0 | 4.6 |
| 1 | 0 | 0 | 1 | 1 | 1 | 1.8 |
| . | . | . | . | . | . | . |
| 0 | 1 | 1 | 1 | 1 | 1 | 5.9 |

It will be appreciated that the entries in Table 7 are merely illustrative and that the sumsquare mismatch values are arbitrary. The actual contents of Table 7 after the first step of this process described above will depend on the received signals.

The second step in the decoding process may use any of the other bits 2, 3, 5, 6 or 8 on which the decision for bit 1 depends. There may be a best choice which will shortly become apparent. For the purposes of illustration, bit 2 (mobile 2) is chosen to decode next. Thus, the rows containing an X in the mobile 2 position are identified. These are rows 1, 2, 3, 5 and 6. Since the signals from antennas 1 and 3 have already been evaluated, these do not need to be processed again, and so only rows 2, 5 and 6 need be considered. Then the other mobile signals that contribute to antennas 2, 5 and 6 are determined. These are mobiles 2, 4, 5, 6 and 9 in this example. All possibilities for mobile signals 2, 5 and 6 have already been evaluated and the mismatch results for predicting antenna 1's signal are stored in Table 7. To predict antenna signals 2, 5 and 6, the new bits 4 and 9 which have come into play now need to be hypothesized. Adding bits 4 and 9 to the list of hypotheses expands the number of hypotheses from 32 to 128. These include 64 combinations of the bits 3, 5, 6, 8 and the new bits 4 and 9 in conjunction with the hypothesis that bit 2 is a 0, and the same 64 in conjunction with the hypothesis that bit 2 is a 1. For each hypothesis, the signal at antennas 2, 5 and 6 are predicted and the sumsquare mismatch is computed and added to the mismatch for bit 1 at the corresponding place in expanded Table 7. Then, for each of the 64 hypotheses for bits 3, 4, 5, 6, 8 and 9, the hypothesis for bit 2 that gives the lowest total mismatch is determined and that row is selected to remain in the table. The determined bit 2 is stored alongside the previously determined bit 1, leading to a new table as shown in Table 8 below.

TABLE 8

| DECISION FOR BITS 1 & 2 | HYPOTHESES FOR BITS | | | | | | LOWEST MISMATCH |
|---|---|---|---|---|---|---|---|
| | 3 | 4 | 5 | 6 | 8 | 9 | |
| 1 | 0 | 0 | 0 | 0 | 0 | 0 | 6.5 |
| 0 | 0 | 0 | 0 | 0 | 0 | 1 | 4.8 |
| 0 | 0 | 0 | 0 | 0 | 1 | 0 | 5.9 |
| 0 | 1 | 0 | 0 | 0 | 1 | 1 | 3.3 |
| 0 | 0 | 0 | 0 | 1 | 0 | 0 | 7.8 |
| 0 | 0 | 0 | 0 | 1 | 0 | 1 | 9.2 |
| 0 | 1 | 0 | 0 | 1 | 1 | 0 | 6.5 |
| 0 | 1 | 0 | 0 | 1 | 1 | 1 | 3.9 |
| . | . | . | . | . | . | . | . |
| 0 | 0 | 1 | 1 | 1 | 1 | 1 | 7.5 |

It will be seen that the column in Table 8 for determined bit 1 does not have the same column pattern as in Table 7, even though the bit 1 decisions are as made previously. This is because the bit 1 decision in a row of Table 8 did not necessarily come from the same row of Table 7. For example, the bit 1 decisions in row 1 of Table 8 may have come from row 1 or row 16 of Table 7 depending on whether the decision for bit 2 was a 0 or a 1. Table 8 illustrates the decision "0" for bit 2 in the first row, therefore the decision "1" for bit 1 is appropriate from Table 7. Of course these selections will vary depending on how the received signal values affect the metrics. Next, those antenna signals which contain mobile signal 3 are identified in Table 6, excluding those antennas whose signals have already been used to compute the mismatches of Table 8. For convenience, the remaining unused rows of Table 6 are shown in Table 9 below.

TABLE 9

| MOBILE NUMBER: | 1 | 2 | 3 | 4 | 5 | 6 | 7 | 8 | 9... |
|---|---|---|---|---|---|---|---|---|---|
| ANTENNA NUMBER 4 | | x | x | x | | | | | |
| ANTENNA NUMBER 7 | | | x | | | x | | x | |
| ANTENNA NUMBER 9 | | x | | | | | x | x | |

Table 9 shows that antennas 4 and 9 receive mobile 3. The signals of these antennas depend on mobile bits 4, 5, 8 and 9. But in Table 8, all possibilities of bits 4,5,8 and 9 have already been hypothesized. Thus bit 3 may be determined without expansion of the number of states.

Thus, for each hypothesis of bits 3, 4, 5, 6, 8 and 9, the signals at antennas 4 and 9 are predicted, mismatches with actually received signals calculated, and the new mismatches accumulated with the previous mismatches in table 8. Then, for each of the 32 hypotheses for bits 4,5,6,8 and 9 it is determined whether the hypothesis with bit(3)=0 has a lower cumulative mismatch than that with bit(3)=1. The decision for bit(3), along with the lower of the two cumulative mismatches and along with the associated previous decisions for bits 1 and 2 from the selected row are now recorded in a new table, Table 10, which reduces back to 32 rows, since there are 32 possible combinations of the as yet undecided bits 4, 5, 6, 8 and 9.

TABLE 10

| DECISION | HYPOTHESES FOR BITS | | | | | LOWEST |
|---|---|---|---|---|---|---|
| FOR BITS 1, 2 & 3 | 4 | 5 | 6 | 8 | 9 | MISMATCH |
| 0 0 1 | 0 | 0 | 0 | 0 | 0 | 9.4 |
| 0 0 0 | 0 | 0 | 0 | 0 | 1 | 6.9 |
| 0 0 1 | 0 | 0 | 0 | 1 | 0 | 8.7 |
| 0 1 1 | 0 | 0 | 0 | 1 | 1 | 6.4 |
| 0 1 1 | 0 | 0 | 1 | 0 | 0 | 9.3 |
| 0 0 1 | 0 | 0 | 1 | 0 | 1 | 11.1 |
| 0 0 1 | 0 | 0 | 1 | 1 | 0 | 7.4 |
| 0 1 0 | 0 | 0 | 1 | 1 | 1 | 6.8 |
| . | . | . | . | . | . | . |
| 0 0 0 | 1 | 1 | 1 | 1 | 1 | 8.2 |

At this point, it may be observed that Table 10 contains only zeros in the bit 1 position. Thus the decision for bit 1 is now unambiguous and can be extracted as the final answer for that bit. Of course the values used in these examples have been arbitrary, however this choice of values for the decided bits column of Table 10 illustrates that the older bits in the decision column have a tendency to converge to the same value. This does not necessarily happen however, and resolution between conflicting values in the column may have to wait until completion of processing.

There remains only one antenna signal not yet processed in this ongoing example. The remaining signal dependence is shown in Table 11.

TABLE 11

| MOBILE NUMBER: | 1 | 2 | 3 | 4 | 5 | 6 | 7 | 8 | 9 ... |
|---|---|---|---|---|---|---|---|---|---|
| ANTENNA NUMBER 7 | | | | x | | | x | | x |

Antenna signal 7 depends on mobile signals 4,7 and 9. The combinations of bits 4 and 9 have already been tested and results are given in Table 10. However, bit 7 is now hypothesized in order to predict signal 7.

Thus the existing 32 hypotheses of Table 10 are expanded to 64 hypotheses by adding a column for bit 7. This allows antenna signal 7 to be predicted for each row in the expanded table, the mismatch with the received signal calculated and added to the cumulative mismatch already in Table 10, and then the process terminates by selecting the single row yielding the lowest mismatch. This may be, for example, the following row.

TABLE 12

| DECISION | HYPOTHESES FOR BITS | | | | | | LOWEST |
|---|---|---|---|---|---|---|---|
| FOR BITS 1, 2 & 3 | 4 | 5 | 6 | 7 | 8 | 9 | MISMATCH |
| 0 0 1 | 1 | 0 | 0 | 1 | 1 | 0 | 9.3 |

Thus all bits 1, 2, 3, 4, 5, 6, 7, 8, 9 are determined as given in this finally selected row to be 001100110 for this example. This is the most likely set of data bits transmitted from the nine mobile units, that best explains (in the least square sense) the signals received at all nine antennas. The result is a true maximum likelihood result, and is the best of all of the $2^9$ (i.e., 512) possible combinations even though all 512 combinations did not explicitly have to be tested. This reduction in effort is one of the benefits obtained when using sequential maximum likelihood sequence estimation. Unlike the Viterbi algorithm, the foregoing process involves the step of sorting antenna signals into groups that depend on a common transmitted bit. These groups can be of random size depending on the propagation paths from mobiles to base units, and so the number of retained rows in the calculation tables (i.e., the number of surviving Viterbi states) is not always the same, as was illustrated in the above example.

The present invention may also be applied to processing signals received at a single site using multiple-sector antennas. A multiple-sector antenna and the polar patterns it creates for reception are shown in FIGS. 6(a) and 6(b), respectively. An 8-sector array can be created by 8 columns of co-phased dipoles on a reflecting surface. The eight radiation lobes or sector patterns created are partially overlapping. A mobile, such as $M_2$ in FIG. 6(b), may lie midway between two lobes and will be equally received in both lobes. A mobile disposed more centrally relatively to a lobe, such as $M_1$, will be principally received by that lobe, but depending on the sharpness of the lobes, may also be received in the two adjacent lobes. Thus, the present invention can be used by first determining a table of which mobiles contribute significantly to the received signal in each lobe, and then applying the inventive process as outlined above. If co-channel mobiles such as $M_1$ and $M_2$ are desired signals, the parent application (which is incorporated here by reference) describes how both may be resolved by a matrix inversion technique, providing the two mobiles are not cosited. Even if the two mobiles are cosited, the parent application describes how a Viterbi process can resolve co-channel mobiles. However, the Viterbi process increases exponentially with the number of co-channel mobiles to be processed. The present application discloses ways in which this complexity can be substantially reduced by taking advantage of the knowledge that not all mobiles are significantly received in all antennas. This is particularly advantageous in a multi-beam, mobile satellite communications scenario as depicted in FIG. 5.

When one or more of the co-channel mobile signals is an unwanted interferer, the parent application describes how a numerical matrix signal processing method can be constructed to maximize the signal-to-noise+interference ratio in demodulating each wanted signal. An unwanted co-channel signal is suppressed in this way by effectively creating a null in the polar pattern at the expense of gain to the wanted signal, or at least achieving a compromise between these conflicting parameters. With the present method however, it is possible to include the unwanted signal in the signal set to be demodulated by also hypothesizing its modulation bits.

Figure 7:
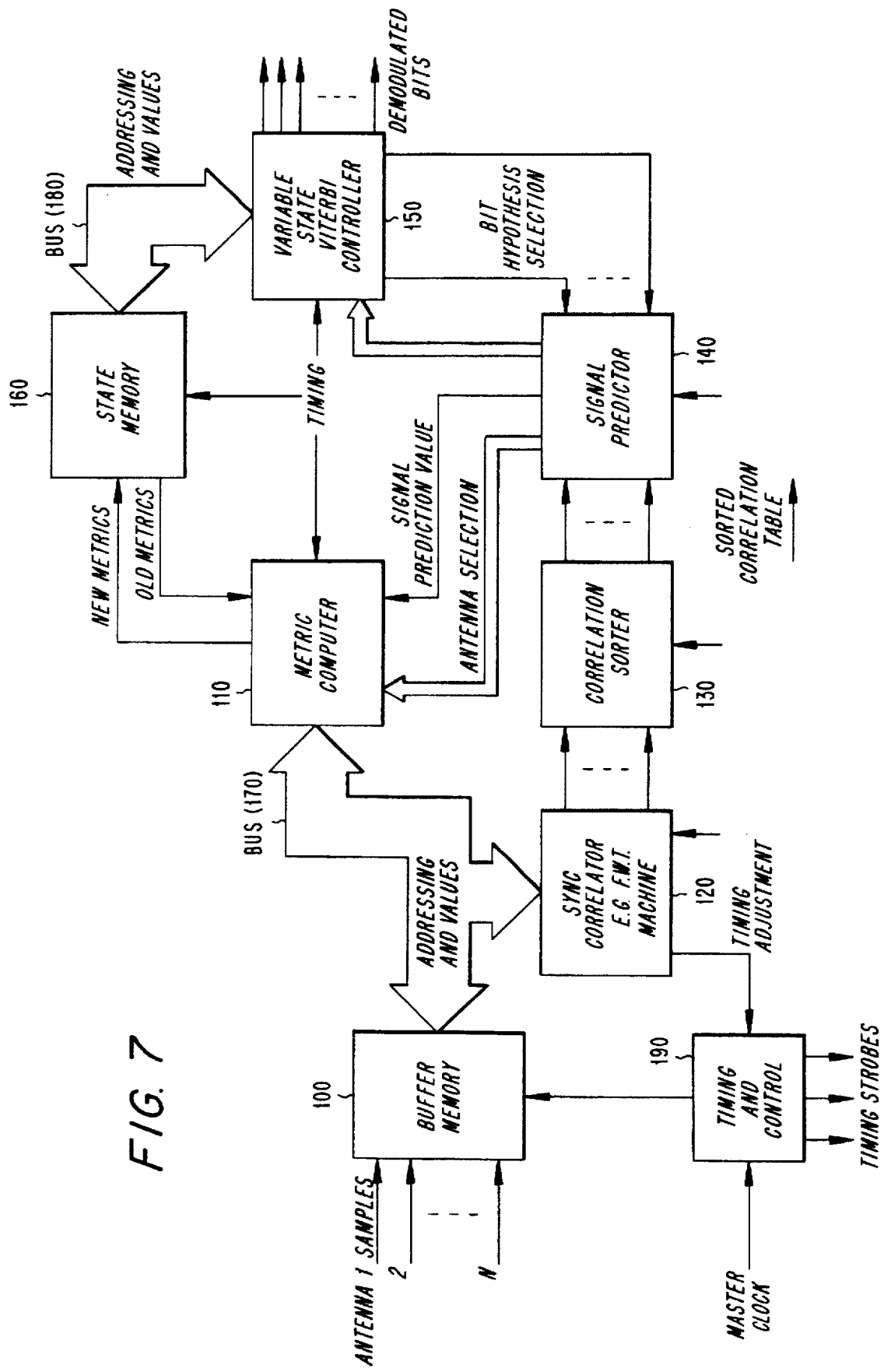
FIG. 7 is a block diagram representation of processing circuitry according to an exemplary embodiment of the present invention.

This exemplary embodiment of the present invention uses estimates of how much of each signal is received at each antenna. This may be achieved by sampling and digitizing the received signal at each antenna, storing a number of samples in a signal processor memory, and then performing correlations with a known bit pattern or syncword contained in each mobile transmission. Preferably, the syncwords of different co-channel mobiles are ed accurately aligned in time, which can be ensured by a time-alignment process at call set-up, and are also orthogonal syncwords so that one signal does not affect the measurement of another signal. An advantage of orthogonal syncwords, as disclosed in the parent application, is that correlation with all syncwords can be performed simultaneously using, for example, a Fast Walsh transform algorithm. It is also possible to use non-orthogonal syncwords. Because the correlation values obtained for one mobile's syncword will contain unwanted contributions from another mobile's syncword, but to an a-priori known extent, a matrix multiplication by the inverse of their a priori known cross-correlation values can be employed to separate out the correct correlations from the unwanted contributions. This process is sometimes referred to as "decorrelation". A block diagram of a signal processing unit that can be employed at a central processing point will now be described with the aid of FIG. 7.

Digitized sample streams from antennas numbered 1 ... N are collected in a buffer memory 100 under the control of a timing unit 190. When a block of samples have been collected, that may for example correspond to one timeslot of a TDMA system, processing begins while samples belonging to the next block are collected. The block contains known symbol patterns transmitted, for example, in the middle of the block, surrounded by unknown symbols. Correlator 120 is then activated by timing and control unit 190 to calculate correlations with the known symbol patterns belonging to each co-channel signal. This can be efficiently performed by a Fast Walsh Transform process if the known patterns are chosen to be orthogonal. The sync correlator produces a correlation spectrum, i.e. an array of complex numbers, for each antenna signal, which is then passed to the correlation sorter 130. The sorter determines and selects, for example, the three strongest correlation spectrum points. The number of correlation points selected can in fact be variable, from 1 to some maximum. The criteria for selection can, for example, be to select values in order from highest to lowest until the energy (sum square modulus) in the selected values exceeds the energy in the remainder by at least a predetermined threshold. The energy in the selected values represents signal energy that will be useful in demodulating wanted signals, while the energy in the remainder represents neglected energy which appears as potentially error-causing interference; therefore selection proceeds until the ratio of useful signal energy to interference energy is adequate to ensure low error probability.

Another criteria which the selection of correlation values can fulfill is that at least one correlation should be selected corresponding to the sync code of any mobile, that is no mobile signal should be neglected on every antenna, otherwise that signal will not be demodulated. This might occur for example if a particular mobile signal was very weak at all antennas. A supplementary selection process can be implemented at least for mobiles whose signal has been neglected on every antenna by the above-described first selection criteria, whereby correlation values corresponding to such a mobile are compared across all antennas and selected in order from strongest to weakest such that the energy in the selected antennas exceeds the energy in the nonelected antennas for that mobile by a predetermined factor, or until a maximum number have been selected.

A further desirable criterion is that, for any mobile-associated correlation value, the antenna signal exhibiting the maximum correlation value for that mobile should be included. That is, the antenna that receives a mobile the best should not be omitted from the selection process.

An alternative selection strategy that the sorter 130 can implement is to assemble the correlation spectra from all the antennas into a two dimensional array of N antennas (vertically) by M mobiles (horizontally). Then values are selected from anywhere in the array in order from greatest to least modulus. The energy, i.e. sumsquare modulus, selected from each row and column is updated after each selection. Selection terminates when, for each row, the energy selected from that row exceeds the energy not selected from that row by a first threshold, and, for each column, the energy selected from that column exceeds the energy not selected from that column by a second threshold. The second of these termination criteria represents the proportion of the energy received from a mobile on all antennas combined that is usefully employed, and it suffices perhaps to use a threshold of, for example, at least half of the received energy to be used (i.e. a ratio of selected to unselected greater than 1). The first criteria however represents the ratio of useful energy to neglected energy that will appear as interference, and this criteria should be more severe, for example a ratio greater than 10.

Other selection criteria can be devised, for example to determine a signal to interference ratio for each mobile signal and each antenna as the ratio of the mobile signal energy at that antenna divided by the energy in as yet unselected components from that antenna. Selection of components then proceeds in order of best to least signal-to-interference ratio, and after each selection, the net signal-to-interference ratio for each mobile that would be obtained by an optimum diversity combiner of already selected components is updated by including the effect of the new selection, noting that selecting a component not only increases the net selected signal energy of the corresponding mobile but also removes it as an interferer, as its effect on other mobile signals will be modelled in the signal predictor 140 and thus taken into account.

The above discussion is not intended to be an exhaustive list of possible selection criteria but suffices to illustrate some of the many devices according to the present invention which can be evaluated, for example, by simulation, for any of the scenarios given in FIGS. 1 to 6 by one skilled in the art. All such processes which reduce the N by M matrix of values to a smaller set by selecting significant components, in order to reduce the complexity of the Viterbi process from that disclosed in the parent application to the reduced complexity disclosed herein, are intended to fall within the spirit and scope of this invention as defined by the claims.

The correlation components selected by sorter 130 are passed to signal predictor 140. Signal predictor 140 receives data symbol hypotheses from Variable-State Viterbi Controller 150 and combines them with corresponding correlations in order to predict a signal at all the antennas selected for demodulating the first of the presented symbols. This first of the presented symbols could, for example, be the bit in the decided bit column of Table 7, or, when more than one bit appears in the decided column as in Tables 8 and 10, the rightmost of these bits.

The Viterbi controller cycles through all combinations of the other bits needed to predict the signals on all the antennas selected for demodulating the first bit, while for each combination toggling the first bit, from 0 to 1 in the manner described above. For each case, the signal predictor computes signal predictions for each antenna and passes them to metric computer 110 where they will be compared with actual antenna signal samples. The sum square error for each combination is accumulated with any previous corresponding metrics from state memory 160 and then rewritten to state memory 160 in an address corresponding to the bit combination tested. The Viterbi controller 150 then, for each combination of the other bits, compares the sumsquare metric for the first (leading) bit equal to 0 and equal to 1 respectively, and picks the smaller of the two to be retained in state memory 160 as described above with the aid of Tables 7, 8 and 10. So that the Viterbi controller knows which other bits must be hypothesized, signal predictor 140 (or alternatively, signal sorter 130) provides a compendium of the other bits needed to predict the antenna signals used for demodulating the leading bit. This compendium is effectively a logical OR of the rows of Table 7 that contain a cross for the bit being demodulated. The Viterbi controller maintains a knowledge of which bit combinations have already been tested and are retained as separate states in state memory 160, and thus can determine, when receiving the compendium, whether all the needed bits are already hypothesized in state memory 160 or whether the number of states must be expanded to include hypotheses of other bits. This is one exemplary implementation of one of the unique features of the inventive processes, namely the variable number of Viterbi states.

The process continues until one sample from each antenna, beyond the number of samples used to produce sync correlations, has been processed, and one bit or symbol from each mobile unit has been demodulated. The sample processed is preferably a sample collected adjacent in time to the samples used for correlation, but can be from either side of the sync pattern. The process then repeats for the next sample from each antenna, moving either forward or backward in time or both alternately.

If the collected sample block being processed in the above manner spans a small enough time period such that said correlations are representative of signals' strengths over the whole block, there is no need to update the correlation values. This occurs when the Rayleigh fading of the signals due to mobile unit motion is slow compared to the time span of the sample block. For example, a sample block length of 0.5 mS satisfies this criteria for a radio frequency of 1900 MHz and vehicle speeds up to 100 kM/Hour. A sample block length of less than 10 mS would satisfy the criterion for walking speeds.

If, however, long sample blocks, high speeds, or high radio frequencies (short wavelengths) result in fading which changes the signal phases and amplitudes over the block relative to those values determined by correlation with the known sync patterns, then it may be desirable to update the correlation values after each iteration of the Viterbi algorithm decodes one symbol from each mobile unit. The decided symbols may then be regarded as an extension of the known symbol patterns allowing the correlation to be extended in length so that the correlation values may be updated to be more recent. The effect of the oldest symbol can be removed or progressively attenuated in this process. An alternative procedure to updating channel estimates which are then used to produce new signal predictions is to precompute signal predictions for each antenna for each combination of bits or symbols on which that signal depends. This method will be further described below. When this method is used, the predictions may be directly updated after each Viterbi iteration, rather than updating channel estimates and recomputing predictions. This method, known as Direct Update Viterbi (DUV) is further described in U.S. Pat. No. 5,331,666 entitled "Adaptive Maximum Likelihood Demodulator" and filed on Jun. 8, 1992, to Paul W. Dent, which is incorporated here by reference. Since the arbitrary data bits that are demodulated do not guarantee that the extended correlations are with orthogonal patterns, a decorrelation approach as described above is the preferred method of updating the correlations or channel estimates. The techniques disclosed by U.S. Pat. No. 5,164,961 (Gudmondsson) which has been incorporated above by reference, and also Kubo (U.S. Pat. No. 5,081,651) are examples of ways to update channel estimates after decoding symbols successively in time, and these ideas may be easily applied by a person skilled in the art to the joint updating of channel estimates for multiple receive paths (antennas) as used in present invention. Since the inventive process described here is applied to bits received at successive locations in space, these processes may be described as resolving intersymbol interference (ISI) in the spatial dimension rather than the time dimension, or indeed as a "spatial equalizer". The Viterbi algorithm is a known form of equalization for time-ISI, and has been inventively modified here for space-ISI. Other forms of equalizer for time-ISI that are known to the art such as the transversal equalizer, Decision Feedback Equalizer (DFE), Maximum a-Posteriori likelihood estimator (MAP) and the inverse-channel equalizer may also be adapted to forms suitable for dealing with spatial-ISI according to this invention. The inverse-channel equalizer for time-ISI, for example, corresponds to the matrix inversion approach for resolving spatial ISI described in the parent application.

Just as hybrid forms of equalization for time-ISI are known to the art, such as "reduced Viterbi", the "M-algorithm" or "Viterbi with DFE taps", so can analogous forms of equalization for spatial ISI be constructed by a person skilled in the art using the principles described herein. All such forms of resolving the spatial ISI between co-channel signals received at successive, spaced antennas are regarded therefore as falling within the scope and spirit of this invention as set out in the claims. A more detailed discussion will now be provided on the operation of a spatial equalizer that uses precomputed signal predictions suitable for application of the DUV according to an exemplary embodiment of the present invention.

Referring to Table 6 it is seen that the signal of antenna number 1 depends on the signal transmitted from three mobiles, numbers 1, 2 and 5. Assuming the mobiles transmit binary signals, and that correlations have been determined as described above, a prediction for antenna 1's composite received signal may be computed for all 8 possible combinations of mobile/bits 1, 2 and 5 and stored in a table $T1(b_1,b_2,b_5)$. Likewise for antenna signals 2–9 we can precompute $T2(b_2,b_4,b_5)$, $T3(b_1,b_2,b_3,b_6)$, $T4(b_3,b_4,b_5)$, $T5(b_2,b_5)$, $T6(b_2,b_5,b_6,b_9)$, $T7(b_4,b_7,b_9)$, $T8(b_1,ib_8)$, and $T9(b_3,b_8,b_9)$.

The final metric for the best bit decisions $b_1 \ldots b_9$ is the sum of T1 to T9 using the decided bits to form table addresses. The algorithm thus determines an optimum path that additively links one value from each table in such a way that a global minimum sum is produced. The algorithm described above may be abbreviated using this notation as follows. First collect the tables that depend on bit 1 together, i.e., $T1(b_1,b_2,..,b_5)$, $T3(b_1,b_2,b_3,..b_6)$ and $T8(b_1,......,b_8)$.

Additively combining these tables produces a new table $T1'(b_1,b_2,b_3,b_5,b_6,b_8)$ having 64 entries. Then, comparing the values in pairs of addresses differing only in the $b_1$ position, i.e. $0,b_2,b_3,b_5,b_6,b_8$ and $1,b_2,b_3,b_5,b_6,b_8$, select the lower of the two entries to retain and create a new table $Tb1(b_2,b_3,b_5,b_6,b_8)$. This table contains 32 metric values and associated values of decided b1 bits indicating which of the two values were retained.

The algorithm proceeds to combine the table $Tb_1$, which has a leading address bit $b_2$, with other tables having $b_2$ as an address bit, namely:

$Tb1(b_2, b_3, , b_5, b_6, b_8)$ $+T2(b_2, , b_4, b_5)$ $+T5(b_2,,,b_5)$ $+T6(b_2,,,b_5,b_6,,b_9)$ to form a new table $Tb2'(b_2,b_3,b_4,b_5,b_6,b_8,b_9)$ of 128 values. Then, the lower of each pair of entries whose address differs only in the $b_2$ position is determined and retained, along with the $b_2$ of the address it came from to obtain the new table $Tb2(b_3,b_4,b_5,b_6,b_8,b_9)$ of 64 values. This is now further combined with tables T3 and T9 that also depend on bit 3. These however depend on no bits that are not already in the address of Tb2, so that the new table $Tb3'(b_3,b_4,b_5,b_6,b_8,b_9)$ is the same size as before. The lower of pairs of values whose address differs only in the $b_3$ position is now determined and retained to yield $Tb3(b_4,b_5,b_6,b_8,b_9)$ having 32 entries. Each entry contains a separate history of the associated decisions $b_1$, $b_2$, $b_3$ that were made when the lower of two values was previously determined.

Table Tb3 is now added to $Tb7(b_4,b_7,b_9)$ to obtain $Tb4'(b_4,b_5,b_6,b_7,b_8,b_9)$ of 64 values. There are no other tables left to combine, so the lowest of the 64 entries is determined, and its associated address $b_4$, $b_5$, $b_6$, $b_7$, $b_8$, $b_9$ is the final decision for those bits. The value of $b_1$, $b_2$, $b_3$ from that address is also the best decision for $b_1$, $b_2$ and $b_3$.

It will be appreciated that the precomputation of prediction tables for each antenna signal, as described above, can lead to an algorithm that is more systematic and easier to implement. It is also easier to implement updating for the case where the channel changes over a data block, using the DUV technique as follows.

After deciding the bits as above, the prediction value from each table indicated by the decided bits is compared with the actually received antenna signal of that table. The prediction value in the table is then modified in a direction that will make that value agree more closely with the received value. For example, 1/16th of the difference between the actual value and the prediction can be added to the old prediction, moving the old prediction 1/16th of the complex vector distance towards the received value. Moreover, the prediction stored in a table address given by the complement of the decided bits can be updated to the negative of the just-updated value. Thus, in a binary system, two predictions in the table can be updated each time or, in a higher order modulation system such as quaternary, four predictions may be updated each time, as described in the aforementioned DUV patent application by Dent.

The method of precomputing signal prediction tables for each antenna after determining a correlation spectrum may also be a systematic way to implement distributed processing. In distributed processing, part of the processing is performed at each antenna, and results passed to neighboring antenna processors, e.g. "along the corridor".

The table $T1(b_1,b_2,b_5)$ defined above can be calculated and stored at antenna 1 ($B_1$ of FIG. 1), having determined that the strongest correlations were obtained using the sync patterns of mobiles 1, 2 and 5. If other mobiles had given stronger correlations, for example $m_0$, $m_1$, $m_3$ and $m_4$, then the table would be denoted by $T1(b_0,b_1,b_3,b_4)$ analogously and would contain 16 rather than 8 values. The number of values included in the table depends on the number of significantly strong mobile signals received, and it can for example be decided to uniformly use a predetermined number of signals (for example, the strongest three, four or five signals), so that the tables are of constant size (e.g., eight, sixteen or thirty-two entries, respectively). Moreover, the comparison of the signal received at antenna 1 can be made with each of these predictions at antenna 1 to form a corresponding metric table $M1(b_1,b_2,b_5)$ and this is passed along signal highway 10 in one or both directions to the next antenna down- or upstream, that is $B_0$ or $B_2$. At $B_2$, correlations with mobile sync patterns have already decided that mobiles 2, 4 and 5 are the significant contributors, prediction table T2 has been calculated, and metric table M2 has been calculated. M2 is now merged with M1 to obtain $M2'(b_1,b_2,b_4,b_5)$, which is passed both forwards to antenna $B_3$ and backwards to antenna $B_1$. $B_1$ will at the same time receive another table M0' passed forwards from $B_0$, that in all probability has $b_1$ as part of its address, because it is likely that mobile 1 is received at $B_0$ to a significant extent. The original M1 table is then combined with the forward and backward-passed tables and then pairs of values are compared that differ only in their address bit $b_1$, and the lower selected. If in each and every case the lower of the two values corresponded to $b_1=1$, then that is a firm decision for $b_1$. If in each and every case the lower value corresponded to $b_1=0$, then the decision is $b_1=0$. On the other hand if the lower value did not always correspond to the same value of address bit $b_1$, then its value is considered still to be indeterminate. If it is desired to simplify the algorithm for a small sacrifice of performance, the lowest metric value can be identified instead at this point and the associated value of its address bit $b_1$ can be taken to be the decision for $b_1$. This simplified procedure can be identical at each antenna, namely values are calculated, passed forward and backward, then values that are received from nearest neighbors are combined with own metric table, and a lowest cumulative metric identified. The address bit (e.g., $b_1$ at $B_1$) corresponding to a mobile unit designated to be demodulated at that site is then the decision for that mobile's data bit.

This simplified procedure can be extended to two dimensional cases such as FIGS. 4 and 5 depict, or to a three dimensional case such as a cordless telephone system installed in the Empire State Building. In these cases, metric tables can be calculated simultaneously at each antenna site and passed to all nearest neighbors. Upon reception of metric tables from nearest neighbors, these are combined with the antenna's own table and the lowest metric determined in order to decode a data bit belonging to at least one mobile designated to be demodulated at that site.

An inherent assumption so far is that data bits received from different mobile units at an antenna are aligned in time. Where ranges are short compared with the bit period times the speed of light, as for example in an indoor application, it is well known that mobile transmitters can be commanded to adjust their transmit timing so that the assumed condition is fulfilled. This is achieved, for example, by a process of measuring time-of-arrival at the base station during the sync correlation procedure, and determining an advance or retard command to be sent to the mobile unit on the base-to-mobile link. A different procedure may be adopted for long range, outdoor systems where it is difficult to ensure time synchronization at more than one location. Moreover, multipath propagation may exist resulting in delayed echoes of a signal also being received. An exemplary technique for extending this process for the long range, multipath environment will be described later.

If the simplified procedure described above of exchanging metric tables between nearest neighbors does not provide adequate performance, the process can proceed according to the Sequential Maximum likelihood principle as follows. A table received from a neighbor is combined with the antenna's own table, resulting (most likely) in an expanded table depending on one more unknown bit or symbol. The neighbor also forwards an indication of any address bit that affected the metric received by the neighbor but not the amount added to the metric by the neighbor. In other words, an indication of a mobile signal that was received by an antenna earlier in the chain but no longer received at the neighbor. If that mobile signal is also not receivable at significant strength at the current location either, the metric table is then contracted around this bit, by determining the lower of two metric values whose address differed only in this bit position. (Or the lowest of four values, in the case of quaternary symbols, or in general the lowest of all the values whose addresses differ by only one symbol). After selection of each lowest value, the bit or symbol value of its address is then remembered in the "decided bits" portion of the metric table. Of the remaining address bits, an indication of that bit which affected the metric the greatest number of stages ago is passed on to the next antenna site along with the contracted metric table. The process then continues until, at some site that is connected to the network, all unambiguously decided bits are extracted and passed to the network before passing on the metric tables to the next site. In this way, the size of the tables and the number of decided bits they contain does not grow indefinitely but remains of size on the order of M to the power of the number of co-channel mobiles that are received at above some threshold signal strength at each antenna, where M is the size of the alphabet of possible symbols (i.e. 2 for binary, etc). If the processing is not distributed to the antenna sites, but signal samples received from antenna sites are passed to a central processing point, then the Sequential Maximum Likelihood algorithm adapted according to this invention can be employed. This situation arises for example in the satellite communications scenario of FIG. 5, where signals received in all satellite antenna beams are transponded to a central ground station or hub station for processing.

The present invention may be described more generally as an equalizer for spatial intersymbol interference as distinct from the known use of equalizer for compensating for intersymbol interference due to time-smearing of symbols transmitted from the same mobile unit. In the case where time-smearing of transmitted symbols into each other also occurs, due to channel bandwidth restrictions or multi-path echoes for example, the present invention may be adapted to include equalizing of both spatial and temporal ISI. One exemplary application of temporal ISI that can benefit from compensation by spatial ISI equalization according to the present invention is that due to sampling transmitted symbols with an arbitrary timing. Normally, a timing adjustment loop would attempt to adjust mobile transmit timing such that all symbols arrived synchronously at any antenna. A sample timing adjustment circuit at the receiver would attempt to sample said synchronously overlapping symbols in the middle of the symbol period where the signals depend principally on a single symbol from each mobile unit. If the combination of transmit filtering, propagation channel and receive channel has the Nyquist property, the samples depend on only one symbol from each mobile. One way of ensuring that the correct sample timing is used with as near the ideal Nyquist property as possible, is to take plural samples at time points spaced throughout the symbol period and to determine during correlation with the known sync pattern which sample timing fulfills the Nyquist condition best, i.e., gives minimum temporal intersymbol interference.

In wide area systems, fulfilling the optimum sample timing at all antenna sites simultaneously may be difficult due to different propagation delays. In this case, it may be better to take time samples regularly at one symbol period intervals, but with arbitrary timing. Each sample in general can then depend on more than one symbol. In practice, each sample rarely depends to a significant extent on more than two symbols. The minimum dependence on symbols other than one occurs when that symbol is sampled in the middle of its symbol period. The maximum dependence on another symbol occurs when the sampling instant lies midway between two symbols. In that case, the sample can be assumed to depend equally on the symbol on either side of the sample. The actual dependence is determined during correlation with said known symbol pattern. By correlating the signal with the pattern and the pattern delayed one symbol period relative to the signal, the dependence on the current symbol and a previous symbol are determined as two complex numbers called "channel estimates". A pair of such channel estimates is then obtained at each antenna for each mobile signal. A received signal at any antenna can then depend on a number of information symbols transmitted by nearby mobiles as well as a number of symbols transmitted by those mobiles previously. Preferably the mobile transmitter timing and the sampling of antenna signals is controlled such that dependence on previously transmitted symbols is lower than dependence on current symbols; this occurs when the sampling instant lies anywhere between the current symbol's center and the midway point between the current and previous symbol. The difference in propagation delays from a mobile to the nearest antenna at which it is strongly received and the farthest antenna may thus be up to half a symbol period while meeting this criterion, or alternatively, when mobile transmit timing and not propagation delays are the major cause of asynchronism, differences in mobile timing may be up to half a symbol period.

The benefit of current symbols being the dominant ones is that this allows resolution of the spatial ISI using the process described above, while allowing compensation for temporal ISI by means of a Decision Feedback Equalizer, which does not result in an increase in the number of hypotheses (i.e., the number of Viterbi states) that have to be tested. If samples received at one or more antennas depend significantly on a future symbol as well as the current symbol, the future symbol may also have to be hypothesized, increasing the number of Viterbi states and consequent complexity. This can be avoided if the future symbol is the dominant symbol at at least one antenna deemed to be strongly receiving that mobile's signal. By re-indexing the symbols transmitted by that mobile such that the future symbol is regarded as the current symbol, and the current symbol is regarded as a past symbol, only the future symbol (now regarded as the current symbol) is hypothesized and resolved by combining tables of metrics that include that symbol. The current symbol (now regarded as a past symbol that was resolved on the last iteration of the spatial equalizer) is taken into account by using the previously decided symbol value in predicting those antenna signals which depend on it, even when said antenna signals depend more on the previous symbol than the current symbol. As long as not all antenna signals depend more strongly on the previously decided symbol, the accuracy of the current decision is guaranteed by the antenna signals that depend more strongly on the current symbol.

For example, suppose the metric table T1 calculated for antenna 1 and metric table T2 calculated for antenna 2 have the following symbol dependence.

| STRONG DEPENDENCE | WEAKER DEPENDENCE |
|---|---|
| <---------------------> | <---------------------> |
| T1(b1(i),b2(i+1),b3(i),b4(i)) ; | b1(i-1),b2(i),b3(i-1),b4(i-1)) |
| STRONG DEPENDENCE | WEAKER DEPENDENCE |
| <---------------------> | <---------------------> |
| T2(b2(i+1),b3(i),b4(i),b6(i)) ; | b2(i),b3(i-1),b4(i-1),b6(i-1)) |

First, the symbol sequence of mobile 2 is re-indexed to make the old b2(i+1) the symbol currently being estimated, b2(i) then having been estimated last time, obtaining:

| STRONG DEPENDENCE | WEAKER DEPENDENCE |
|---|---|
| <---------------------> | <---------------------> |
| T1(b1(i),b2(i),b3(i),b4(i)) ; | b1(i-1),b2(i-1),b3(i-1),b4(i-1)) |
| STRONG DEPENDENCE | WEAKER DEPENDENCE |
| <---------------------> | <---------------------> |
| T2(b2(i),b3(i),b4(i),b6(i)) ; | b2(i-1),b3(i-1),b4(i-1),b6(i-1)) |

Suppose now that the metric table for antenna 3 had the following dependence:

| STRONG DEPENDENCE | WEAKER DEPENDENCE |
|---|---|
| <---------------------> | <---------------------> |
| T3(b2(i),b3(i),b6(i)) ; | b2(i-1),b3(i-1),b6(i-1)) |

After re-indexing mobile number 2's symbols, the table for antenna 3 will be written:

| STRONG DEPENDENCE | WEAKER DEPENDENCE |
|---|---|
| <---------------------> | <---------------------> |
| T3(b2(i-1),b3(i),b6(i)) ; | b2(i-2),b3(i-1),b6(i-1)) |

Since this signal does not any longer depend on the current $b_2$ symbol, b2(i), being hypothesized, it is not used in the decoding of $b_2(i)$, even though antenna number 3 receives mobile 2 strongly. Instead, the symbol b2(i) is decoded by combining only tables T1 and T2, and the symbols $b2_{i-1}$ and b2(i-2) on which T3 depends would have been decided previously by combining earlier tables T1 and T2. Thus decisions taken previously in time at instants (i-1) and (i-2) (for b2) and at instant (i-1) (for b3 and b6) are used to calculate table T3 at instant (i), which then depends only on hypothesizing b3(i) and b6(i), T3(b3(i),b6(i)). By use of decision feedback in this way (DFE in the temporal dimension), the metric table sizes required to resolve ISI in the spatial dimension are kept to a minimum.

Figure 8:
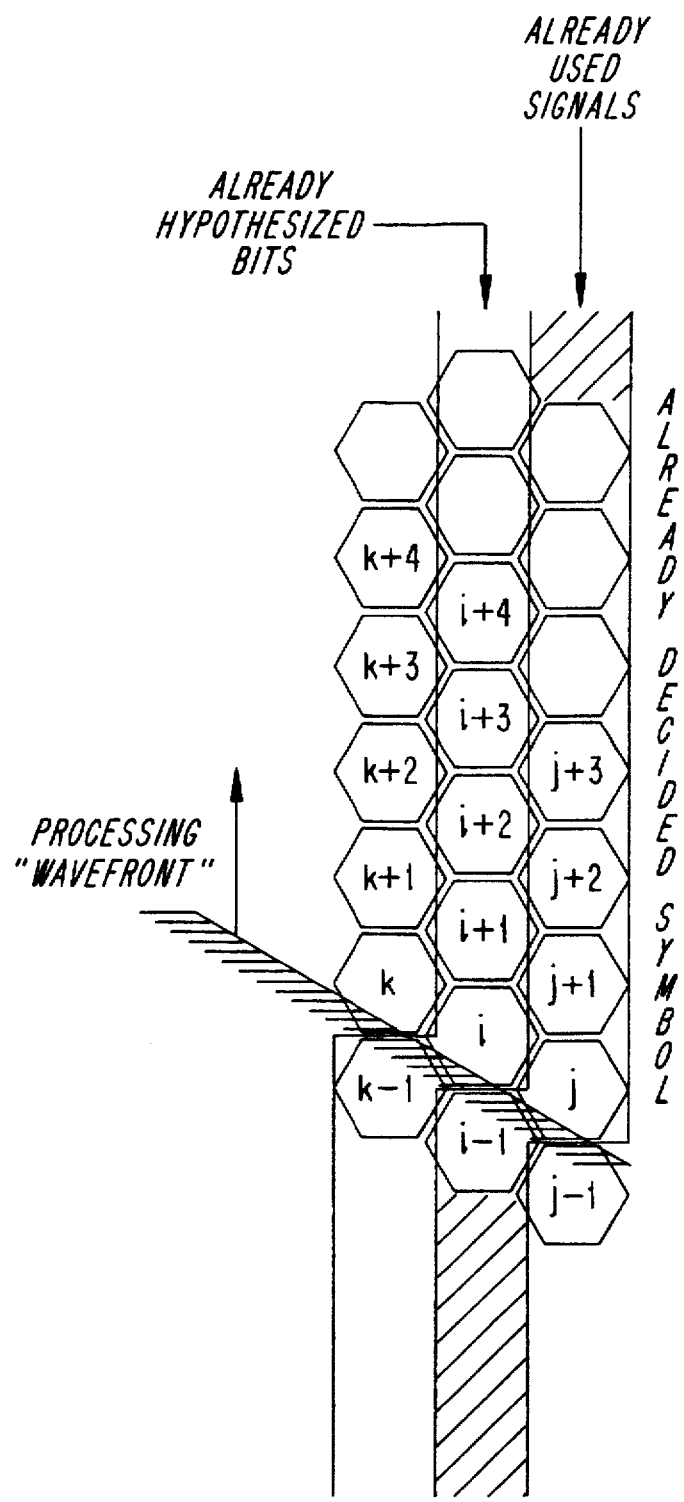
FIG. 8 illustrates the two-dimensional nature of signal processing according to exemplary embodiments.

In the two-dimensional case such as in FIG. 5, there could be a tendency for metric table sizes to become excessive unless processing proceeds in an optimum way. First it will be illustrated with the help of FIG. 8 that metric table sizes do not need to grow indefinitely in the 2-D case. FIG. 8 illustrates a column of "cells" labelled j-1, j, j+1 and so on in which symbols j-1 and below, and symbols to the right, have been partially decided and appear in the decision history of the metric tables. Moreover, signals received by antennas in cells i and above have already been incorporated into the metric values, as have signals in cells i-1 and below. In processing signal i-1, it was moreover necessary to hypothesize the data symbol transmitted in cell k-1, and likewise data symbols in all cells in the 'i' column and cells k-1 and below in the 'k' column have been hypothesized. The next step is to 'decide' the symbol transmitted in cell j by processing any remaining received signals that depend on that symbol into the metric table and then contracting the table around symbol(j).

Because cell(i) is adjacent to the cell(j) in which symbol (j) was transmitted, it is likely that the signal received in cell(i) depends on symbol(j). Signals from all other cells surrounding cell(j), such as j-1, j+1 and i-1 have already been incorporated into the metric table computation. To incorporate the new signal(i), this signal is first predicted as a function of all symbols transmitted in cells surrounding it. The symbols in surrounding cells i-1, i+1, j, j+1 and k-1 have already been hypothesized and are indices of the current metric table. Symbol(k) has not however, so one extra symbol is hypothesized, symbol(k), used to predict signal(i), the last as yet unused signal on which symbol(j) depends, the predicted signal(i) compared with the actually received signal(i), and the squared mismatch accumulated with the current metrics. Performing the above for all hypotheses of symbol(k) first expands the metric table, but then determining and retaining the lowest of groups of metrics that differ only in symbol(j) contracts the table back to the original size. Thus metric table sizes do not fundamentally have to grow indefinitely. The above discussion for the infinite distribution omits however to clarify how many as yet unresolved hypotheses have to be retained, and omits to discuss boundary effects in a finite distribution case. It serves, however, to give an understanding of how an optimum processing sequence is derived for the finite, practical case such as shown in FIG. 9.

Figure 9:
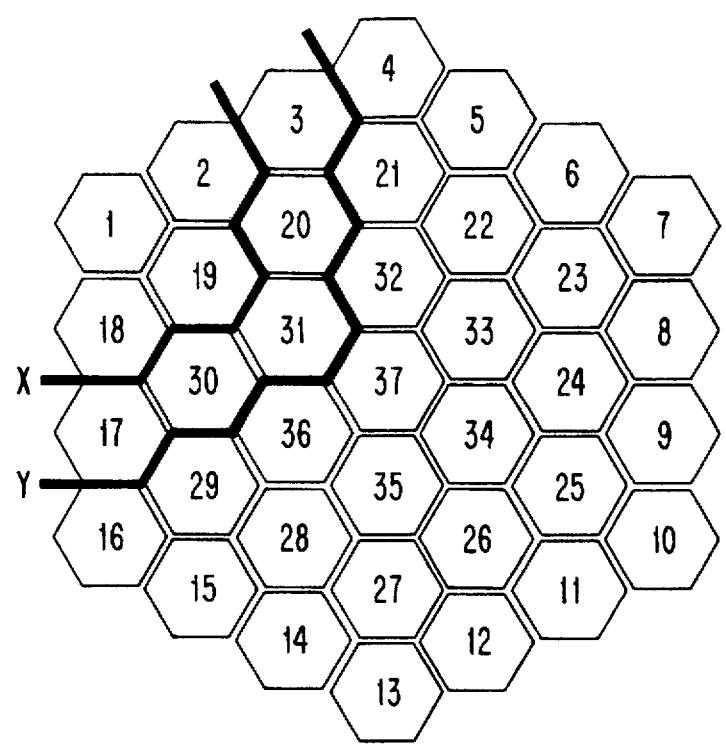
FIG. 9 shows a 37 cell frequency reuse pattern.

FIG. 9 illustrates a cluster of 37 cells each capable of providing a communication link of the same channel frequency, i.e., co-channel signals. To the left of the darkened line labelled "X" in FIG. 9 are those cells surrounding cell 1 that may receive a signal from a mobile in cell 1, i.e., cells 2, 18 and 19. Similarly, line "Y" establishes the other adjacent co-channel cells, i.e., 3, 17, 20, 30 and 31, whose signals may also affect the "X" group cells 2, 18 and 19. Thus, by postulating bits from all of the cells to the left of line "Y" hypotheses for signals in cells 2, 18 and 19 can be determined. The order of processing of the co-channel signals in FIG. 9 could, for example, be:

| STEP | POSTULATED BITS | PREDICTED SIGNALS | BIT RESOLVED | HYPOTHESES REMAINING |
|---|---|---|---|---|
| 1 | 1,2,3,18,19,20, 17,30,31 | 2,18,19 | 1 | 256 |
| 2 | 2,3,18,19,20,17 30,31,4,21,32 | 1,20,3 | 2 | 1024 |
| 3 | 3,18,19,29,17,30 31,4,21,32,16,29,36 | 17,30 | 18 | 4096 |
| 4 | 3,19,20,17,30,31 4,21,32,16,29,36,37 | 31 | 19 | 4096 |
| 5 | 3,20,17,30,31,4,21 32,16,29,36,37,5,22 | 4,21 | 3 | 8192 |
| 6 | 20,17,30,31,4,21,32 16,29,36,5,22,33 | 32 | 20 | 8192 |
| 7 | 17,30,31,4,21,32,16 29,36,37,5,22,33,6 | 5 | 4 | 8192 |
| 8 | 17,30,31,21,32,16,29 36,37,5,22,33,6,23 | 22 | 21 | 8192 |
| 9 | 17,30,31,32,16,29,36 37,5,22,3,6,23,7 | 6 | 5 | 8192 |
| 10 | 17,30,31,32,16,29,36 37,22,33,6,23,7,15,28 | 16,29 | 17 | 16384 |
| 11 | 30,31,32,16,29,36,37 22,33,6,23,7,15,28,35 | 36 | 30 | 16384 |
| 12 | 31,32,16,29,36,37,22 33,6,23,7,15,28,35,34 | 37 | 31 | 16384 |
| 13 | 32,16,29,36,37,22,33 6,23,7,15,28,35,34,24 | 33 | 32 | 16384 |
| 14 | 16,29,36,37,22,33,6 23,7,15,28,35,34,24,8 | 23,7 | 22,6 | 8192 |
| 15 | 16,29,36,37,33,23,7 15,28,35,34,24,8,9 | 8 | 7 | 8192 |
| 16 | 16,29,36,37,33,23,15 28,35,34,24,8,9,25 | 24 | 23 | 8192 |
| 17 | 16,29,36,37,33,15,28 35,34,24,8,9,25,26 | 34 | 33 | 8192 |
| 18 | 16,29,36,37,15,28,35 34,24,8,9,25,26,27 | 35 | 37 | 8192 |
| 19 | 16,29,36,15,28,35,34 24,8,9,25,26,27,14 | 28,15 | 16,29,36 | 2048 |
| 19 | 15,28,35,34,24,8,9 | 14 | 15 | 2048 |

-continued

| STEP | POSTULATED BITS | PRE-DICTED SIGNALS | BIT RE-SOLVED | HYPOTHESES REMAINING |
|---|---|---|---|---|
| 20 | 25,26,27,14,13 28,35,34,24,8,9 | 27 | 28 | 2048 |
| 21 | 25,26,27,14,13,12 35,34,24,8,9,25 | 26 | 35 | 2048 |
| 22 | 26,27,14,13,12,11 34,24,8,9,25,26 27,14,13,12,11,10 | 10,11,25,9 | ALL REMAIN-ING BITS 34 ... 10 | 1 |

In the above example it can be determined that 173,312 states are in total processed to demodulate 37 bits, an average of less than 5000 states per bit. This is considerably less than the 2 to the power 37 possible answers. Moreover, in practice the number of states per bit for this example would be considerably less than 5,000 for the following three reasons. First, not all signals in the six surrounding cells that can affect the signal received by that cell's antenna are active. For example, half of the 37 signals are in general silent in one direction while the other direction is talking. Second, not all signals that are active significantly affect the signals received in adjacent cells. A mobile significantly affects signals received in an adjacent cell only if the mobile unit lies proximate the border of an adjacent cell, but then it cannot simultaneously lie toward the border of the diametrically opposite cell. Third, the system will not in general be fully loaded in all cells, i.e. not all cells will contain a mobile unit using every channel frequency available to that cell.

In addition, a number of channel frequencies are generally available for allocation to different groups of mobile units, and a channel allocation method can be used as disclosed in the parent application to avoid simultaneous co-site/co-channel conflicts. Thus, in order to set up a new call, the network can first ascertain the group of mobiles using the same frequency that the new mobile can also use, and allocate the new call to that group which results in the minimum number of states to be processed in order to resolve the symbols transmitted by that group of mobiles. Thus the channel allocation method of the parent application, which aimed to facilitate the resolution of mobile signals by the inverse-matrix type of spatial equalization, can be adapted to facilitate the resolution of mobile signals by other types of spatial equalization, such as the maximum likelihood spatial equalizer disclosed here. For these reasons, the growth in "states" or "as yet unresolved hypotheses" is likely to be less than the square root of the highest number obtained above for the worst case, for example, only 128 instead of 16384 states.

Moreover, there may be more efficient orders of processing than exemplified above, particularly when a cell temporarily has no active signalling. The processing order in that case can be adapted to take maximum advantage of cells that do not affect other cells' signals to prevent expansion in or to secure early contraction of the number of states. All such variations may be implemented by the invention and are deemed to be within the scope of the invention as set out in the claims.

The above discussion has concentrated on exemplary embodiments of the invention applicable to, for example, the multiple-access, wireless telephone downlink (i.e., the base to mobile direction). Of course, the principle of transmitting from multiple transmitters distributed in a spatial dimension and then sampling the spatial wave with distributed receivers may also be applied to the base-to-mobile (i.e., the uplink) direction. In this case, the mobile units would represent the spatially distributed receiving antennas that sample the wave in the spatial dimension. However, the methods discussed above provide for joint processing of the samples collected by the multiple receiving antennas. On the fixed network side, this is possible because samples can be collected at a central processing point or exchanged between receivers along fixed connections. These fixed connections are suitably wire, coaxial cable or optical fiber in an indoor wireless application, and trunk lines or microwave links in an outdoor, wide-area application. In the downlink direction however, mobile receiving units have no apparent mechanism to exchange samples or otherwise cooperate in the demodulation of multiple base station transmissions. Nevertheless, if such a mechanism were provided, the system could utilize the methods already disclosed and thus fall within the scope of the invention as disclosed above. In the absence of such a mechanism to exchange information or cooperatively process signals however, an alternative method can be used to confer the same advantages for the downlink as the already described methods confer on the uplink.

One advantage of the present invention is that it allows re-use of the same radio channel frequency for adjacent mobiles, without the wasteful bandwidth expansion of Code Division Multiple Access and without the disadvantage of having to invert matrices that can turn out to be ill-conditioned. Another advantage of the present invention is that multiple diversity reception of every signal is provided. Thus, a method suitable for the downlink that provides these same advantages is "joint demodulation" combined with transmit diversity.

In joint demodulation, a mobile unit demodulates not only the signal of its serving base station but also that of at least one interfering base station. This may be performed, for example, using the Viterbi algorithm in a known manner. Symbol hypotheses are made not only for the desired signal but also for the significant interferers and are used to predict the signal that should be received. The quadratic error between the signal predicted and the signal received is accumulated and the symbol sequence showing the lowest cumulative error is chosen. If received signals are perfectly synchronous and exhibit no temporal ISI, then no Viterbi algorithm is necessary. For example, if a wanted binary signal and two similar interferers are hypothesized, eight hypotheses are tested and the single best hypothesis showing the least quadratic error is selected. If, however, symbols are received asychronously with a time-stagger, the time at which a wanted symbol would be decided may not coincide with the time at which an interfering symbol can be decided. In that case, the wanted symbol is decided separately for all assumptions of what the future decisions for the interfering symbols may be, leading to use of a Viterbi algorithm. A Viterbi algorithm is also used when the current decisions depend on future symbols due to temporal ISI. The Viterbi algorithm is actually desirable in such cases to increase performance. Thus it can be advantageous to create artificial temporal ISI where none exists naturally in the propagation path. This is the function of the "transmit diversity" element of the downlink method.

Using transmit diversity, two or more surrounding base stations, preferably those which a mobile has identified as best received, transmit the same information to the same mobile. One base station, however, delays the modulation of the signal by one information symbol, for example. This has the effect that the transmitted signals are not in fact identical, thus avoiding the possibility of destructive signal interference. Thus, instead of the second signal contributing to the Rayleigh fading phenomenon, it represents instead an alternative, delayed signal path that exhibits uncorrelated Rayleigh fading and thus provides a path diversity gain, being simply that the chance of both paths fading simultaneously is less than the chance of a single path temporarily fading out. The introduction of transmit diversity thus allows the use of the Viterbi algorithm, which provides then improved performance for resolving spatial ISI at the same time as resolving the deliberately introduced temporal ISI.

The adaptation according to the present invention of equalizers for spatial, as opposed to the usual temporal, ISI suggests adaptation of equalizers to other domains. Other possible domains are transform domains of either time or space domains. For example, the frequency domain is the Fourier transform of the time domain. ISI arising in the frequency domain means interference between symbols transmitted on different frequencies, for example adjacent channel interference. Adjacent channel interference is usually eliminated by using selective filtering in the receiver to pass only the wanted signal and to reject the unwanted signal, however, the present invention may be adapted as an alternative to or supplement to filtering, to provide enhanced adjacent channel signal rejection. This invention is particularly useful in a base station that aims to demodulate signals on all channels, and in particular, to a form of multi-carrier base station known as a wideband digital base station. In a wideband digital base station, the signal received at an antenna is digitized in a wide bandwidth using a fast AtoD convertor. The high-sample rate numerical stream is then processed numerically to separate different frequency channels. The digital processing can comprise a digital filter bank and/or a Fast Fourier Transform machine. The output of this digital channelization processor is an array of numbers representing at least one sample per symbol transmitted to the base station in each frequency channel. The samples, however, may not be purely a function of the symbol in one channel due to adjacent channel interference arising because of imperfect channel filtering or imperfect transmitted spectra that spill over into adjacent channels, causing interference even with ideal channel filtering at the receiving station. This interference arises principally between channels that are adjacent to each other along the frequency dimension and interference from two channels away is most likely negligible. Thus, adjacent channel interference can be regarded as ISI in the frequency dimension and resolved by adapting an equalizer according to the present invention to process signals along the frequency dimension instead of along the time or space dimensions.

Thus, an inventive demodulator for a multi-channel receiver in the presence of adjacent channel interference would include a processor for making hypotheses of symbols transmitted on a first channel as well as hypotheses of symbols transmitted on a second channel; using these hypotheses jointly to predict the signal that should be observed on the first channel viewed through the receiver's channel filter; comparing the predictions with the actually received signal and to calculate a mismatch or metric therefrom; making hypotheses for signals on a third channel to use jointly with hypotheses of the first and second channels transmitted symbols in order to predict the signal viewed through the second channel's receive filter and accumulating mismatches for sequentially-consistent hypotheses made on successive channels in a like manner and to select the sequence having the lowest cumulative mismatch after processing all channel signals, thus demodulating a symbol from every channel while cancelling the otherwise deleterious effect of imperfect adjacent channel isolation.

It will be realized that a receiver with enough processing capacity to handle the expanded number of states to be tested can be constructed according to this invention to demodulate multiple signals transmitted from multiple locations using multiple frequency channels and multiple receiving paths. An algorithm can be so-constructed which will simultaneously handle temporal ISI, spatial ISI and frequency ISI (adjacent channel suppression). With the current state of the art in digital signal processing, complexity may limit full implementation of Maximum Likelihood Estimation in all three domains simultaneously, but it is expected that technology will continuously improve to allow extension of the invention to ever more complex situations involving greater numbers of mobile signals, receiving sites and frequency channels.

In two-way wireless telephone systems it is often the performance of the uplink which is the limiting factor, due to mobile signals received at base stations exhibiting independent fading. The downlink is often not the limiting factor, owing to multiple signals transmitted from the same base station exhibiting precisely the same fading as received by a single mobile. Thus in the above description of a correspondingly advantageous solution for the downlink, a mobile unit can establish the instantaneous channel estimate for the path from the base unit with a single correlation, however many overlapping co-channel signals the base signal comprised. Since the uplink often has the poorer performance, the present invention has concentrated on providing new techniques for improving the performance of the uplink, however alternative, similar means have also been described for improving the performance of the downlink.

I claim:

1. A method of communicating between a plurality of spatially distributed mobile radio units and a radio network using the same radio frequency, comprising the steps of:
   transmitting information symbols simultaneously from said mobile units on said same radio frequency;
   sampling a radio wave on said same radio frequency at different points in space using a plurality of spatially distributed antennas to produce spatial signal samples; and
   jointly processing said spatial signal samples using an equalizer adapted to resolve spatial intersymbol interference between said information symbols in order to reproduce said transmitted information symbols.

2. A method according to claim 1 in which said information symbols transmitted from said mobile units include at least one known symbol pattern.

3. A method according to claim 2 in which said known symbol pattern is different for each co-channel mobile unit within a given area.

4. A method according to claim 3 in which said different symbol patterns are mutually orthogonal symbol patterns.

5. A method according to claim 4 in which said equalizer calculates correlations with said orthogonal symbol patterns using an orthogonal transform.

6. A method according to claim 5 in which said orthogonal transform is one of a Fast Walsh Transform, a Fast Fourier Transform or a Walsh-Fourier Transform.

7. A method according to claim 2 in which said equalizer calculates a correlation with said at least one known symbol pattern.

8. A method according to claim 3 in which said equalizer calculates correlations with said different symbol patterns.

9. A method according to claim 1 in which said equalizer is a maximum likelihood sequence estimator and further comprising the step of:

estimating a block of information symbols comprising at least one symbol transmitted simultaneously from each of said plurality of said mobile units.

10. A method according to claim 9 in which said maximum likelihood sequence estimator has a state memory to hold a number of symbol hypotheses to be resolved and an associated number of cumulative metrics.

11. A method according to claim 10 further comprising the step of:

commanding a mobile unit to stop transmitting on said same radio frequency and to switch to another frequency in order to reduce said number of symbol hypotheses to be resolved.

12. A method according to claim 1 in which said equalizer is a decision feedback equalizer and further comprising the step of:

estimating a block of information symbols comprising at least one symbol transmitted simultaneously from a plurality of said mobile units, wherein said symbols are estimated in order of a symbol transmitted from a first of said plurality of mobile units to a symbol transmitted from a last of said plurality of mobile units wherein symbols within said order of first to last that have already been estimated are used to assist estimation of symbols remaining to be estimated.

13. A method of communicating between a plurality of mobile radio units and a radio network using a first plurality of radio frequencies, comprising the steps of:

transmitting information symbols simultaneously from said mobile units using, for each mobile unit, an associated one of said plurality of radio frequencies;

sampling a radio wave on all of said radio frequencies using a multi-channel receiver to produce samples along a frequency domain; and jointly processing said frequency-domain samples using an equalizer adapted to resolve frequency-domain intersymbol interference between signals on adjacent ones of said plurality of radio frequencies in order to reproduce said transmitted information symbols.

14. A method of communicating between a plurality of spatially distributed mobile radio units and a radio network using the same radio frequency, comprising the steps of:

transmitting information symbols simultaneously from said mobile units on said same radio frequency;

sampling a radio wave on said radio frequency at different points in space using a plurality of spatially distributed antennas to produce spatial signal samples;

determining for each of said antennas a group of mobile units whose transmissions are significant contributors to that antenna's signal to yield grouping information; and processing said spatial signal samples sequentially in an order dependent on said grouping information in order to reproduce said transmitted information symbols.

15. The method of claim 14, wherein said step of determining further comprises:

identifying a predetermined number of mobile units whose transmissions are most strongly received at each of said antennas as said significant contributors.

16. A method of communicating between a plurality of spatially distributed mobile radio units and a radio network using a plurality of radio frequencies, comprising the steps of:

transmitting information symbols simultaneously from said mobile units using, for each mobile unit, an associated one of said plurality of radio frequencies;

sampling a radio wave on a number of said plurality of radio frequencies using a multi-frequency receiver to produce samples along a frequency domain;

determining, for each of said number of frequencies, a group of mobile units whose transmissions are significant contributors to a signal received on that frequency to produce grouping information; and processing said frequency domain samples sequentially in an order dependent on said grouping information in order to reproduce said transmitted information symbols.

17. The method of claim 16, wherein said step of determining further comprises:

identifying a predetermined number of mobile units whose transmissions are most strongly received at each of said antennas as said significant contributors.

18. A method of communicating between groups of spatially distributed mobile radio units and a radio network using the same radio frequency for mobiles in the same group, comprising the steps of:

grouping mobile units into groups that use the same radio frequency to facilitate demodulation of the symbols transmitted by the mobiles within a group by a spatial equalizer;

transmitting information symbols simultaneously from mobile units in the same group using the same radio frequency;

sampling a radio wave for each said group frequency at different points in space using a plurality of spatially distributed antennas to produce spatial signal samples; and jointly processing said spatial signal samples using a spatial equalizer for each group adapted to resolve spatial intersymbol interference between mobiles in the group in order to reproduce information symbols transmitted by mobiles in said group.

19. A method according to claim 18 in which said spatial equalizers also produce demodulation performance information for each group.

20. A method according to claim 19 in which said demodulation performance information for each group is used to indicate when a change to the original grouping should be performed.

21. A method according to claim 19 in which said performance information for each group is used by a channel allocation algorithm to determine the group association and radio channel best allocated to a new mobile unit requesting communication with the network.

22. A communications system for receiving information symbols transmitted from a number of spatially distributed mobile units using a number of directive antenna beams, comprising:

signal correlation means for determining correlations indicating an amplitude and phase of signals transmitted from said mobile units and received using said beams;

sorting means for processing said correlations to further determine for each received beam signal a group of mobile units whose transmitted symbols are significant contributors to that beam to provide grouping information; and signal spatial equalizer means for sequentially processing said beam signals in an order determined by said grouping information to resolve said information symbols transmitted by said mobile units.

23. The communications system of claim 22, further comprising:

means for determining when a mobile unit has temporarily ceased transmission and to temporarily remove said mobile unit from the group determined by said sorting means.

24. The communications system of claim 23, further comprising:

means for re-adapting said processing order used by said spatial equalizer to take account of removal of said mobile signal from said grouping.

25. The communications system of claim 23 further comprising:

means for determining when a mobile unit has resumed a transmission that was temporarily discontinued earlier and for determining new grouping information, and means for re-adapting said processing order using said new grouping information.

26. The communications system of claim 22 wherein said directive beam antennas are located on an orbiting satellite and signals received using said antennas are relayed to a central ground station for processing.

27. The communications system of claim 22 wherein said directive beam antennas include a cellular base station sectorised antenna.

28. The method of claim 22, wherein said step of determining further comprises:

identifying a predetermined number of mobile units whose transmissions are most strongly received at each of said antennas as said significant contributors.

29. A communications system for receiving information symbols transmitted from a plurality of spatially distributed mobile units using a plurality of antenna elements, comprising:

combining means for combining signals received using said plurality of antenna elements to form a plurality of beam signals corresponding to signals received from particular directions;

signal correlation means for determining correlations indicating an amplitude and phase of signals transmitted from said mobile units and contained in said beam signals;

sorting means for processing said correlations to further determine for each formed beam signal a group of mobile units whose transmitted symbols are significant contributors to that beam signal to provide grouping information; and spatial equalizer means for sequentially processing said beam signals in an order determined by said grouping information to resolve said information symbols transmitted by said mobile units.

30. The method of claim 29, wherein said step of determining further comprises:

identifying a predetermined number of mobile units whose transmissions are most strongly received at each of said antennas as said significant contributors.

31. A method of communicating between a plurality of spatially distributed mobile radio units and a radio network using the same radio channel frequency, comprising the steps of:

transmitting information symbols simultaneously from said mobile units on said same radio frequency;

sampling a radio wave on said radio frequency using a plurality of antenna elements to produce antenna signal samples;

processing said antenna signal samples using a beam forming network to separate signals received from different directions to obtain direction-corresponding beam signals each beam being a weighted sum of signals transmitted from a different subset of said mobile radio units wherein at least two of said subsets include a signal from a same mobile radio unit; and jointly processing said beam signals associated with said at least two of said subsets using a spatial equalizer adapted to resolve intersymbol interference between information symbols received from different mobile units in angularly adjacent beams in order to reproduce said transmitted information symbols.

32. A two-way communications method for communicating between a plurality of mobile units and a fixed network, comprising the steps of:

transmitting uplink information from at least two of said mobile units to said fixed network using the same radio frequency;

using a spatial equalizer in said fixed network to resolve spatial intersymbol interference between said at least two mobile signals to reproduce said transmitted uplink information;

forming a second plurality of downlink signals for transmission by respective transmitters of said fixed network, each downlink signal including symbols to be transmitted to a different plurality of said mobile units;

transmitting downlink information from said fixed network to said mobile units using a second plurality of transmitters; and jointly processing at least one mobile unit signals received from at least two of said plurality of transmitters to reproduce a portion of said downlink information intended for said at least one mobile unit.

* * * * *